US008557466B2

(12) United States Patent
Nakagawa et al.

(10) Patent No.: US 8,557,466 B2
(45) Date of Patent: Oct. 15, 2013

(54) FUEL CELL INCLUDING SEPARATOR WITH GAS FLOW CHANNELS

(75) Inventors: Takashi Nakagawa, Osaka (JP); Masatoshi Teranishi, Osaka (JP)

(73) Assignee: Panasonic Corporation, Osaka (JP)

( * ) Notice: Subject to any disclaimer, the term of this patent is extended or adjusted under 35 U.S.C. 154(b) by 1252 days.

(21) Appl. No.: 12/065,572

(22) PCT Filed: Jun. 21, 2007

(86) PCT No.: PCT/JP2007/062532
§ 371 (c)(1),
(2), (4) Date: Mar. 3, 2008

(87) PCT Pub. No.: WO2007/148761
PCT Pub. Date: Dec. 27, 2007

(65) Prior Publication Data
US 2009/0162717 A1 Jun. 25, 2009

(30) Foreign Application Priority Data
Jun. 21, 2006 (JP) .................................. 2006-171995

(51) Int. Cl.
*H01M 8/10* (2006.01)
*H01M 8/02* (2006.01)
*H01M 4/86* (2006.01)

(52) U.S. Cl.
USPC ........... 429/457; 429/413; 429/483; 429/458; 429/534; 429/523

(58) Field of Classification Search
USPC ......... 429/434, 465, 492, 456, 454, 479, 443, 429/457, 514, 414, 413, 483, 458, 534, 523
See application file for complete search history.

(56) References Cited

U.S. PATENT DOCUMENTS

| 4,292,379 | A | * | 9/1981 | Kothmann ..................... 429/514 |
| 5,776,625 | A | * | 7/1998 | Kaufman et al. ............. 429/434 |
| 6,194,095 | B1 | * | 2/2001 | Hockaday ..................... 429/413 |

(Continued)

FOREIGN PATENT DOCUMENTS

| CN | 1367941 | 9/2002 |
| JP | 56-134473 | 10/1981 |

(Continued)

OTHER PUBLICATIONS

Machine Translation of: JP 2004/281304, Enami, Y, Oct. 7, 2004.*

(Continued)

*Primary Examiner* — Kenneth Douyette
(74) *Attorney, Agent, or Firm* — Greenblum & Bernstein, P.L.C.

(57) ABSTRACT

A fuel cell having a capability of making uniform a water distribution in an in-plane direction of a polymer electrolyte membrane and supplying a reactive gas to an air electrode catalyst layer efficiently is provided. The fuel cell of the present invention has a polymer electrolyte membrane, a pair of catalyst electrodes, and a pair of metal separators. An air electrode separator has an oxidizing gas flow channel used to supply an oxidizing gas to the catalyst electrodes. The oxidizing gas flow channel is formed in such a manner that a flow channel near an oxidizing gas supply manifold and a flow channel near an oxidizing gas exhaust manifold are adjacent to each other in the same plane, and is formed in an S-shaped or spiral pattern.

7 Claims, 15 Drawing Sheets

(56) References Cited

U.S. PATENT DOCUMENTS

| | | | |
|---|---|---|---|
| 6,365,293 B1 * | 4/2002 | Isono et al. | 429/434 |
| 6,605,381 B1 | 8/2003 | Rosenmayer | |
| 6,818,339 B1 * | 11/2004 | Sugawara et al. | 429/492 |
| 2003/0113608 A1 * | 6/2003 | Hong et al. | 429/34 |
| 2004/0234829 A1 * | 11/2004 | Sederquist et al. | 429/26 |
| 2005/0048351 A1 * | 3/2005 | Hood et al. | 429/38 |
| 2005/0271926 A1 | 12/2005 | Sugita et al. | |

FOREIGN PATENT DOCUMENTS

| | | |
|---|---|---|
| JP | 59-182871 | 12/1984 |
| JP | 62-062413 | 12/1987 |
| JP | 8-045520 | 2/1996 |
| JP | 2000-243409 | 9/2000 |
| JP | 2002-151105 | 5/2002 |
| JP | 2002-164064 | 6/2002 |
| JP | 2003-109620 | 4/2003 |
| JP | 2003-203644 | 7/2003 |
| JP | 2004-241230 | 8/2004 |
| JP | 2004-281304 | 10/2004 |
| JP | 2005-228619 | 8/2005 |
| JP | 2005-276637 | 10/2005 |
| JP | 2006-049197 | 2/2006 |

OTHER PUBLICATIONS

Machine Tranlation of: JP 2006/049197, Yoshizawa, Y, Feb. 16, 2006.*
English Translation of JP 59/182871 U, Kosei Sadata, Dec. 5, 1984.*
English Translation of JP 62/062413 B, Nakazawa et al., Dec. 26, 1987.*
"Predicting the Effect of Gas-Flow Channel Spacing on Current Density in PEM Fuel Cells", Naseri-Neshat et al., AES—vol. 39, Proceedings of the ASME Advanced Energy Systems Division, p. 337-350, 1999.*
"The impact of channel path length on PEMFC flow-field design", Shimpalee et al., Journal of Power Sources, Jan. 26, 2006.*
China Office action, mail date is Feb. 22, 2012.
English language Absract of JP 2002-151105, May 24, 2002.
English language Abstract of JP 2003-109620, Apr. 11, 2003.
English language Abstract of JP 56-134473, Oct. 21, 1981.
English language Abstract of JP 2000-243409, Sep. 8, 2000.
English language Abstract of JP 2003-203644, Jul. 18, 2013.

* cited by examiner

PRIOR ART

PRIOR ART

FUEL CELL INCLUDING SEPARATOR WITH GAS FLOW CHANNELS

TECHNICAL FIELD

The present invention relates to a fuel cell, particularly to a solid polymer fuel cell having a polymer electrolyte membrane.

BACKGROUND ART

A fuel cell is basically composed of a polymer electrolyte membrane selectively transporting hydrogen ions and a pair of catalyst electrodes (a fuel electrode and an air electrode) sandwiching the polymer electrolyte membrane therebetween. The fuel cell having the foregoing configuration can produce continuously electrical energy from a fuel gas (containing hydrogen) supplied to the fuel electrode (anode) and an oxidizing gas (containing oxygen) supplied to the air electrode (cathode).

The catalyst electrode is disposed on the side of the polymer electrolyte membrane. The catalyst electrode is composed of a catalyst layer promoting a redox reaction of the catalyst electrode and a gas diffusion layer that is breathable and electrically conductive, disposed on the outer side of the catalyst layer. Further, the gas diffusion layer is composed of a carbon coat layer disposed on the side of the catalyst layer, which facilitates the contact to the catalyst layer, and a gas diffusion base material layer which diffuses a gas supplied from the outside and supplies the gas to the catalyst layer. The unified body of the polymer electrolyte membrane and the pair of the catalyst electrodes (including catalyst layer, carbon coat layer, and gas diffusion base material layer) is called a membrane electrode assembly (hereinafter called as "MEA").

MEA can be electrically connected in series by stacking. When MEA is stacked, an electrical conductive separator is disposed between each MEA so as not to mix the fuel gas and the oxidizing gas, and to electrically connect each MEA. The assembly given by sandwiching MEA between a pair of the separators is called "fuel cell" or simply "cell". A stack product of plural fuel cells is called "fuel cell stack" or simply "stack".

In the fuel cell, a gas flow channel is formed in the face of the separator in contact with the catalyst electrode so as to supply a reactive gas (fuel gas or oxidizing gas) to the catalyst electrode and to discharge excess gas and excess water. The gas flow channel formed on the separator is generally composed of plural straight parallel-flow channels that are communicated with tubes called as a manifold running through the fuel cell stack. The manifold supplies the reactive gas to the gas flow channel and discharge excess gas and water out of the gas flow channel for all of the fuel cells in the fuel cell stack.

In general, the cell or stack is sandwiched by collector plates, insulator plates, and terminal plates and provides a fuel cell configured in a form used generally.

In the fuel cell having the foregoing configuration, when the fuel gas containing hydrogen is supplied to the fuel electrode and the oxidizing gas containing oxygen is supplied to the air electrode, electrical energy can be produced in accordance with the reactions mentioned below.

The hydrogen supplied to the fuel electrode diffuses through the gas diffusion layer of the fuel electrode and reaches the catalyst layer. In the catalyst layer, the hydrogen is separated into a hydrogen ion and an electron. The hydrogen ion is transported to the air electrode through the polymer electrolyte membrane in a water-retaining state. The electron is transported to the air electrode through an external circuit. The electron passing through the external circuit can be used as electrical energy. In the catalyst layer of the air electrode, the hydrogen ion transported through the polymer electrolyte membrane reacts with the electron transported through the external circuit and the oxygen supplied to the air electrode, whereby water is generated.

The fuel cell, as mentioned above, generates water by the power generation reaction. The power generation efficiency of the fuel cell decrease when the inside of the cells is excessively wetted with water, so that the water generated on the power generation is discharged to the outside with the help of the gas that flows the flow channel formed on the separator.

A material of perfluorosulfonic acid is used in many cases for the polymer electrolyte membrane through which the hydrogen ion is transported. The polymer electrolyte membrane is ion conductive when the membrane retains water sufficiently, but it loses the ion conductivity under drying condition. Therefore, in order to allow the power generation reaction to proceed efficiently over the entire face of the fuel cell, it is required to prevent the inside of the cell from being dried and to keep uniform in-plane water distribution in the cell.

In order to prevent the inside of the cell from being dried and to keep uniform the in-plane water distribution in the cell, an external-humidifying method has been employed so far, where the inside of the cell is humidified from the outside. By the external-humidifying method, an external-humidifier supplies a reactive gas which has a dew point higher than the internal temperature of the fuel cell, and makes the inside of the cell being over-humidified. However, this method has a disadvantage of causing easily flooding in which the supply of the reactive gas to the catalyst layer is prevented, because water droplets are generated in the gas diffusion layer. In addition, the method has another disadvantage of having difficulty in reducing the cost of the fuel cell system, because the external humidifier is required. Furthermore, the method has another disadvantage of having difficulty in driving the fuel cell at a high temperature where a high efficiency of power generation is expected, because the internal temperature of the fuel cell is required to be lower than the reactive gas dew point attainable by the external humidifier.

As a method that addresses the foregoing disadvantages of the external humidifying method, there has been proposed an internal humidifying method through which the inside of the cell is humidified by diffusing the water generated by the power generation reaction into the cell. However, in the internal humidifying method, the polymer electrolyte membrane placed near the inlet of the reactive gas tends to dry, because the reactive gas supplied from the outside is dry. On the other hand, the polymer electrolyte membrane placed near the outlet of the reactive gas becomes excessively wetted with water in many cases, because the reactive gas that passes through the gas flow channel contains the water generated by the power generation reaction. In the internal humidifying method, the in-plane water distribution in the cell becomes non-uniform and the power generation reaction proceeds mainly on the outlet side of the reactive gas. In this way, the internal humidifying method still has a disadvantage of lowering the power generation efficiency as a whole cell.

As a method that addresses the foregoing disadvantage of the internal humidifying method, there has been proposed a method in which a reactive gas supply manifold is placed adjacent to a reactive gas discharge manifold (for example, refer to Patent Document 1).

FIG. 1 shows a front view (perspective view) of a fuel cell in accordance with Patent Document 1. The structure of a separator on a fuel electrode side is drawn with solid lines and the structure of a separator on an air electrode side is drawn with dashed lines. In FIG. 1, a fuel gas supply manifold 10 and a fuel gas discharge manifold 12 are disposed in such a manner that they are adjacent to each other, and they are communicated with each other through a fuel gas flow channel 14 having a rectangular geometry. Similarly, an oxidizing gas supply manifold 20 and an oxidizing gas discharge manifold 22 are disposed in such a manner that they are adjacent to each other, and they are communicated with each other through an oxidizing gas flow channel 24 having a rectangular geometry. The above configuration allows the water near the outlet of the reactive gas (on the side of the reactive gas discharge manifold) to be transported to the inlet side of the reactive gas (on the side of the reactive gas supply manifold) through an electrolyte membrane. In this way, the gas on the outlet side can be prevented from being excessively wetted, and the gas on the inlet side can be prevented from being dried.

As mentioned above, by disposing the reactive gas supply manifold and the reactive gas discharge manifold in such a manner that they are adjacent to each other, the water can be transported through the electrolyte membrane in the in-plane direction thereof, whereby the in-plane water distribution of the polymer electrolyte membrane can be made uniform.

However, the fuel cell of Patent Document 1 has a disadvantage of requiring complex structures in the cell and the stack in order to make the cell area large. That is, the fuel cell of Patent Document 1 is required to increase the number of manifold and the accompanied structures thereof when the side length of the cell becomes larger, because the reactive gas supply manifold and the reactive gas discharge manifold are disposed in such a manner that they are adjacent to each other in each of the rectangular gas flow channel (see FIG. 1). Therefore, when the cell area is made large, the structures of the inside cell and stack become complex, whereby the production cost of the fuel cell becomes high.

Furthermore, the fuel cell of Patent Document 1 also has a disadvantage of having a low capability of transporting the water in an in-plane direction. That is, the water can be transported more efficiently between the outlet side and the inlet side of the reactive gas when the difference in the amount of the water retained in each side is larger. In order to increase the amount of the water on the outlet side of the reactive gas, the length of the reactive gas flow channel may be made larger. However, in the fuel cell of Patent Document 1, because the gas flow channel has a rectangular geometry, the length of the gas flow channel is limited by the side length of the cell and the distance between the manifolds (refer to FIG. 1). Therefore, the fuel cell of Patent Document 1 has a low capability of transporting the water in an in-plane direction.

As a method that addresses the above disadvantages, for example, there is the one that is disclosed in Patent Document 2.

FIG. 2 shows a front view of a separator on the side of an air electrode of a fuel cell in accordance with Patent Document 2. In FIG. 2, an oxidizing gas supply manifold 1a and an oxidizing gas discharge manifold 1b are disposed in such a manner that they are adjacent to each other. And more, a flow channels 25 are meander-shape forward and return flow channels, and the forward flow channel and the return flow channel are adjacent to each other. This configuration allows reduction of the number of manifolds. As a result, the structure of the cell and stack hardly becomes complex when the area of the fuel cell is increased. The ribs that determine the outline of the flow channel are porous and they have capillaries connecting the forward flow channel with the return flow channel. This configuration allows the water on the outlet side of the reactive gas (on the side of the reactive gas discharge manifold) to be transported to the inlet side of the reactive gas (on the side of the reactive gas supply manifold). In this way, the in-plane water distribution of a polymer electrolyte membrane can be made uniform.

In order to make uniform the partial pressure of the reactive gas on the inlet side of the reactive gas (on the side of the reactive gas supply manifold) and the partial pressure of the reactive gas on the outlet side of the reactive gas (on the side of the reactive gas discharge manifold), there has been proposed a method in which the cross-sectional area of a reactive gas flow channel is decreased from upstream side to downstream side at a set ratio (for example, refer to Patent Document 3). In Patent Document 3, the reactive gas flow channel is composed of plural channels which are connected in parallel. The number of parallel flow channels of the downstream part is smaller than the number of parallel flow channels of the upstream part in such a manner that the cross-sectional area in the downstream part is decreased as compared with the cross-sectional area in the upstream part. Furthermore, in Patent Document 3, the gas flow channel is snaked in order to decrease the number of the manifold.

Patent Document 1: Japanese Patent Laid-Open Publication No. 2002-151105
Patent Document 2: Japanese Patent Laid-Open Publication No. 2003-109620
Patent Document 3: Japanese Patent Laid-Open Publication No. S56-134473.

DISCLOSURE OF THE INVENTION

Problems to be Solved by the Invention

In the fuel cell of Patent Document 2, through the capillaries connecting the forward flow channel with the return flow channel, the reactive gas as well as the water is transported from the upstream side of the flow channel to the downstream side of the flow channel. As a result, the fuel cell of Patent Document 2 has a disadvantage of difficulty in distributing sufficient amount of the reactive gas to the whole cell, because the reactive gas is transported from the upstream side of the flow channel to the downstream side of the flow channel, and the reactive gas is circulated between the upstream side of the flow channel and the downstream side of the flow channel.

It is an object of the present invention to provide a fuel cell having capabilities of providing a uniform in-plane water distribution of a polymer electrolyte and supplying efficiently an oxidizing gas to an air electrode catalyst layer.

Means for Solving the Problems

A fuel cell of the present invention has a membrane electrode assembly composed of a polymer electrolyte membrane and a pair of catalyst electrodes sandwiching the polymer electrolyte membrane therebetween, and a separator having a gas flow channel supplying a fuel gas or an oxidizing gas to the membrane electrode assembly. The gas flow channel is formed of a S-shaped or spiral pattern. A upstream flow channel of the gas flow channel is adjacent to a downstream flow channel of the gas flow channel. The wall of the gas flow channel has no gas permeability.

Effect of the Invention

According to the present invention, the in-plane water distribution of a polymer electrolyte membrane included in the fuel cell can be made uniform. In particular, the in-plain water distribution of the polymer electrolyte membrane can be made uniform even in an operation under a high temperature and low humidified condition or a high temperature and non-humidified condition, so that a fuel cell being operable under a high temperature and low humidified condition or a high temperature and non-humidified condition can be provided. In addition, the oxidizing gas can be prevented from being transported between the upstream flow channel of the gas flow channel and the downstream of the gas flow channel, so that the reactive gas can be supplied efficiently to the air electrode catalyst layer.

BEST MODE FOR CARRYING OUT THE INVENTION

Figure 1:
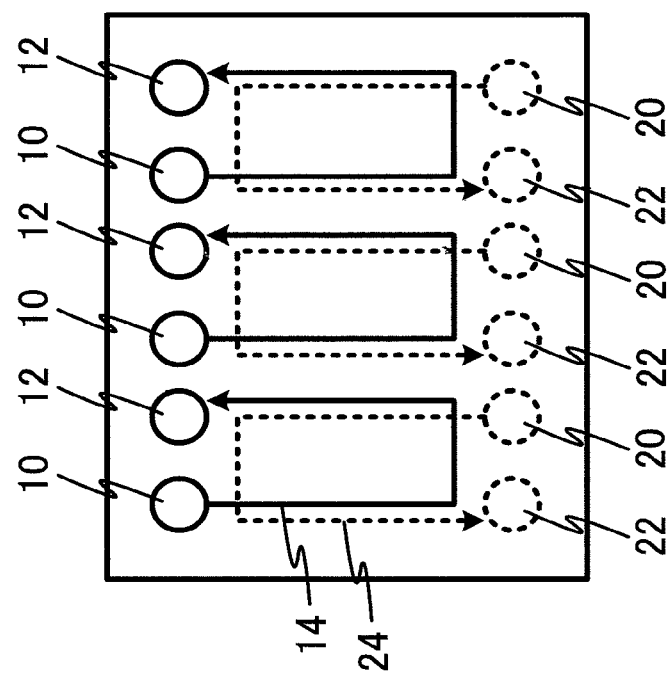
FIG. 1 shows a front view of a separator of a conventional fuel cell.
Figure 2:
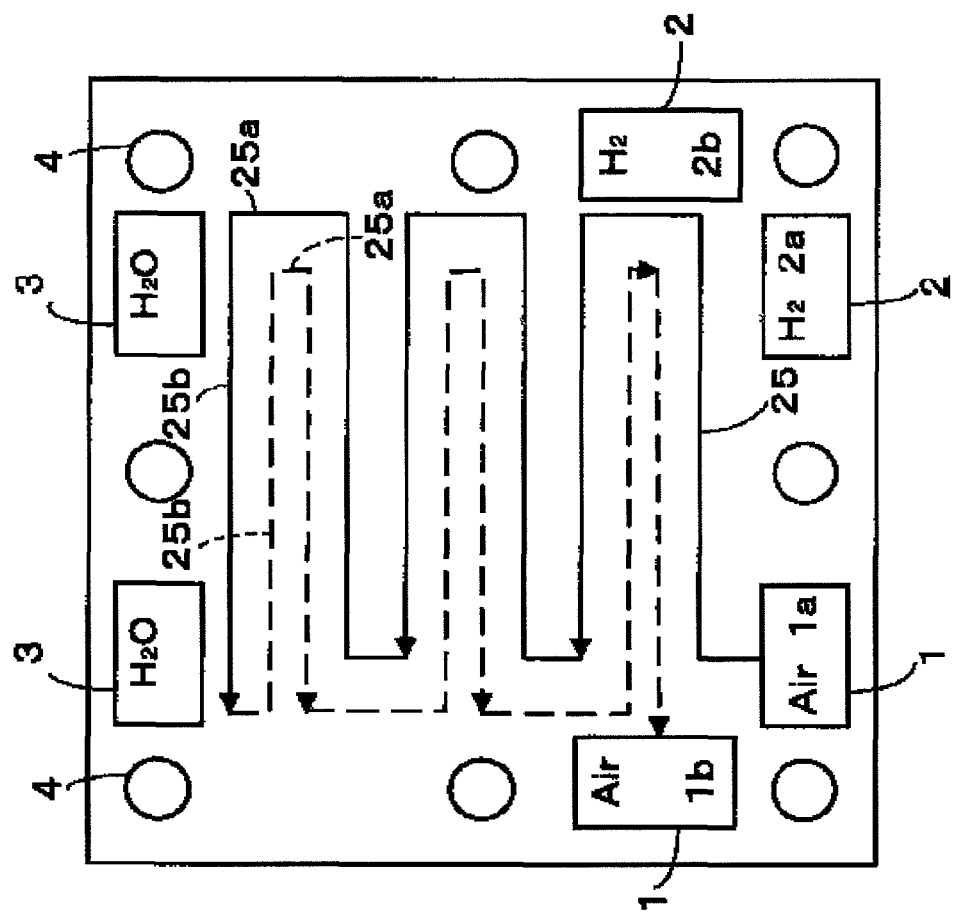
FIG. 2 shows a front view of a separator of another conventional fuel cell.

The fuel cell of the present invention has at least one cell. Namely, the fuel cell of the present invention may be a single fuel cell or may be a fuel cell stack consisting of plural cells. In general, the fuel cell or stack is sandwiched by collector plates, insulating plates, and terminal plates, and is further fixed with fastening rods.

The fuel cell has a polymer electrolyte membrane, a pair of catalyst electrodes sandwiching the polymer electrolyte membrane therebetween (a fuel electrode and an air electrode), and separators sandwiching an MEA (assembly of the polymer electrolyte membrane and the catalyst electrodes). Each catalyst electrode is composed of a catalyst layer disposed on the side of the polymer electrolyte membrane and a gas diffusion layer disposed on the side of the separator.

The polymer electrolyte membrane is a polymer membrane having hydrogen ion conductivity. The material of the polymer electrolyte membrane is not particularly limited as long as the material is capable of transporting selectively a hydrogen ion.

The catalyst layer contains a catalyst for the redox reaction of hydrogen or oxygen. The catalyst layer is not particularly limited as long as the catalyst layer is electrically conductive and is catalytically active for the redox reaction of hydrogen or oxygen.

The gas diffusion layer is a porous layer having electrically conductive. The material of the gas diffusion layer is not particularly limited as long as the material has electrically conductive and is capable of diffusing a reactive gas. The gas diffusion layer may be composed of a gas diffusion base material layer that diffuses a gas supplied from the separator side to the catalyst layer, and a carbon coat layer that improves the contact between the gas diffusion base material layer and the catalyst layer.

The separator is an electrically conductive plate having a fuel gas flow channel on the face in contact with a fuel electrode, and an oxidizing gas flow channel on the face in contact with an air electrode. An example of the material used for the separator may include carbon, metal, and the like. The face of the separator having the gas flow channel has a depressed portion and a protruded portion, and the depressed portion constitutes the gas flow channel.

The separator may be a separator (hereinafter called "carbon separator") that is prepared by first feeding a raw material powder mixture of carbon powder and a resin binder to a mold, and then applying pressure and heat to the raw material powder mixture supplied into the mold. The carbon separator is described, for example, in Japanese Patent Laid-Open Publication No. 2000-243409.

Furthermore, the separator may be a separator (hereinafter called "metal separator") that is made of a metal plate. The metal separator is described, for example, in Japanese Patent Laid-Open Publication Nos. 2003-203644 and 2005-276637.

The metal plate composing as the metal separator has a front face and a rear face. The metal plate may be formed in such a manner that the depressed portions on the front face correspond to the protruded portions on the rear face, and the protruded portions on the front face correspond to the depressed portions on the rear face. The method of forming a reactive gas flow channel on the metal plate is not particularly limited. For example, press machining is selected as the method of forming the reactive gas flow channel.

The material of the metal plate is not particularly limited as long as the material has good electrical conductivity and corrosion resistance. An example of the material used for the metal plate may include stainless steel. The thickness of the metal plate is not particularly limited as long as the metal plate has enough strength to form the separator. For example, the thickness of the metal plate is from 0.01 mm to 1 mm. The size of the metal plate is not particularly limited as long as the metal plate has enough size for sandwiching the MEA, and may be selected as appropriate.

By using the metal separator, sufficient strength of the separator can be obtained even though the thickness of the separator is 1 mm or less. As a result, the cell and stack can be reduced in size and weight. In addition, the metal separator can be easily produced by press machining and the like, so that the production cost reduction and mass production become attainable.

The reactive gas flow channel on the separator is formed in such a manner that the flow channel near the inlet of the gas flow channel (hereinafter, called "upstream flow channel") and the flow channel near the outlet of the gas flow channel (hereinafter, called "downstream flow channel") are adjacent to each other in the same plane and that the reactive gas can be supplied to the entire face of the catalyst electrode. Furthermore, the wall of the reactive gas flow channel is formed in such a manner that the wall has no permeability to the reactive gas. Here, "wall of the reactive gas flow channel" refers to the protruded portion of the separator that is positioned between the two reactive gas flow channels adjacent to each other. In order to supply the reactive gas to the entire face of the catalyst electrode, for example, the reactive gas flow channel can be formed in an S-shaped or spiral pattern. Note that, the upstream flow channel and the downstream flow channel of the one gas flow channel are not required to be adjacent to each other. The upstream flow channel of a first gas flow channel and the downstream flow channel of a second flow channel may be adjacent to each other. When the thickness of the gas diffusion layer is from 200 μm to 300 μm, the width of the flow channel is 1.1 mm, and the depth of the flow channel is 1.1 mm, the efficiency of power generation of the fuel cell marks the highest in the case that a spacing between the upstream flow channel and the downstream flow channel is from 2.2 mm to 3.3 mm. Therefore, when the thickness of the gas diffusion layer is from 200 to 300 μm, the width of the flow channel is 1.1 mm, and the depth of the flow channel is 1.1 mm, the spacing between the upstream flow channel and the downstream flow channel is preferably from 2.2 mm to 3.3 mm. An example of the structure of a reactive gas flow channel is shown in FIG. 3.

Figure 3A:
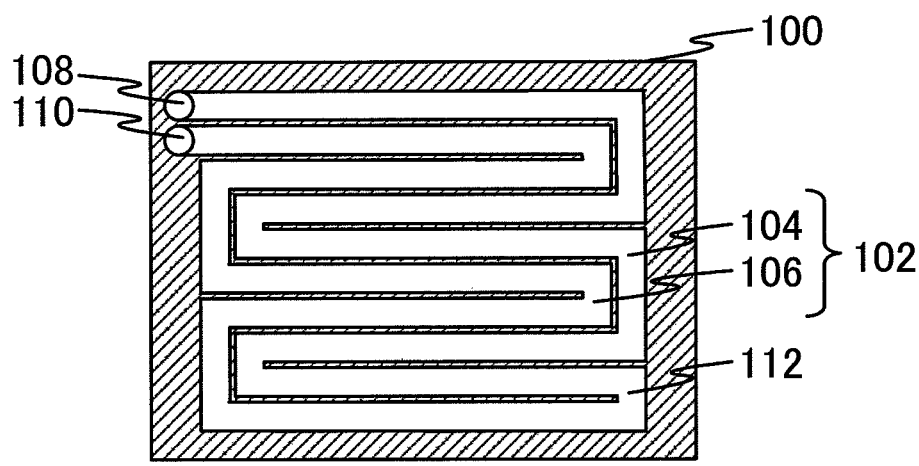
FIG. 3 shows a front view of a separator illustrating an example of the structure of a reactive gas flow channel according to the present invention.

In an example shown in FIG. 3A, a reactive gas flow channel 102 formed on a separator 100 is a forward and return flow channel formed in such a manner that a reactive gas forward flow channel 104 and a reactive gas return flow channel 106 are formed in opposite directions each other over the entire flow channel. The reactive gas forward flow channel 104 is from the flow channel inlet 108 to a turn-around portion 112, and the reactive gas return flow channel 106 is from the turn-around portion 112 to a flow channel outlet 110. And the forward flow channel 104 and the return flow channel 106 are S-shaped while they are kept to be adjacent to each other. Here, "in opposite directions each other" refers to a state such that these two flow channels are adjacent to each other and the flow directions of the reactive gas in these two flow channels are opposite to each other. As mentioned above, the reactive gas flow channels are formed in opposite directions each other preferably not only near the inlet and outlet of the reactive gas flow channels but also over the entire flow channels (the upstream flow channel and the downstream flow channel). Furthermore, the flow channel inlet 108 and the flow channel outlet 110 are preferably adjacent to each other.

Figure 3B:
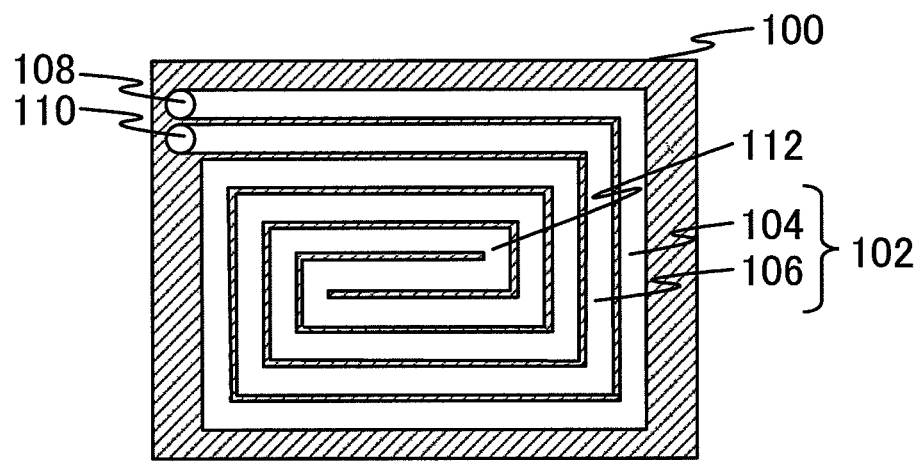

In an example shown in FIG. 3B, the reactive gas flow channel 102 is a forward and return flow channel similarly to the example shown in FIG. 3A. The reactive gas forward flow channel 104 and the reactive gas return flow channel 106 are spiral-shaped while they are kept to be adjacent to each other.

Figure 3C:
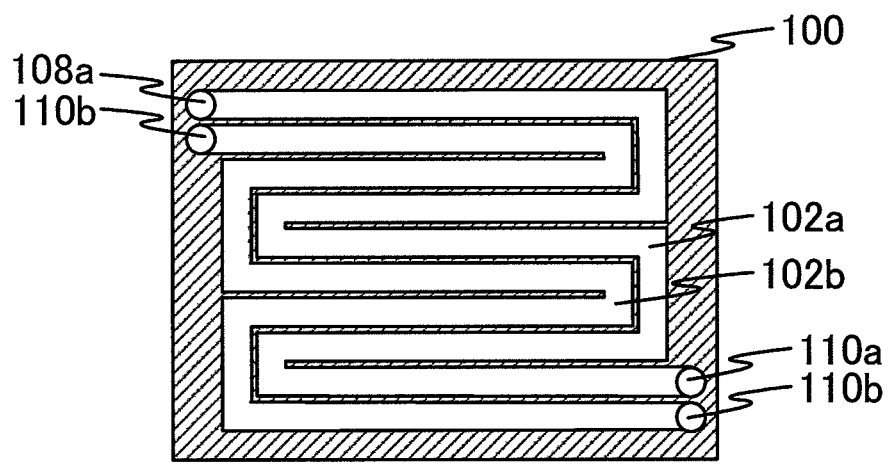

In an example shown in FIG. 3C, two reactive gas flow channels 102a and 102b are formed on the separator 100. The reactive gas flow channel 102a and the reactive gas flow channel 102b are in opposite directions each other over the entire flow channels, and the reactive gas flow channel 102a and the reactive gas flow channel 102b are S-shaped while they are kept to be adjacent to each other.

In the fuel cell of the present invention, when a fuel gas containing hydrogen gas is supplied to the fuel gas flow channel on the separator, and an oxidizing gas containing oxygen gas is supplied to the oxidizing gas flow channel, electrical energy can be obtained in accordance with the reactions mentioned below.

Firstly, the hydrogen molecule supplied to the fuel electrode diffuses through the gas diffusion layer and reaches the catalyst layer of the fuel electrode. At the catalyst layer, the hydrogen molecule split into a hydrogen ion and an electron. The hydrogen ion is transported through the humidified polymer electrolyte membrane to the air electrode. The electron is transported through an external circuit to the air electrode. On this occasion, the electron passing through the external circuit can be used as electrical energy. At the catalyst layer of the air electrode to the air electrode, the hydrogen ion that is transported through the polymer electrolyte membrane to the air electrode, the electron that is transported through the external circuit to the air electrode, and oxygen that is supplied to the air electrode react to generate water.

In the fuel cell of the present invention, the upstream flow channel and downstream flow channel of the reaction gas flow channel are formed in such a manner that they are adjacent to each other, so that water is transported in an in-plane direction inside of the fuel cell. Water transportation in the in-plane direction on the air electrode side will be explained below.

On power generation, the fuel cell temperature becomes high, so that the water generated at the air electrode catalyst layer is vaporized to form steam. The steam is transported by diffusion in the gas diffusion layer of the air electrode and humidifies the oxidizing gas in the oxidizing gas flow channel. The steam partial pressure in the oxidizing gas that flows through the oxidizing gas flow channel is elevated as the oxidizing gas flows from the inlet to the outlet. That is, the steam partial pressure of the oxidizing gas flowing in the downstream flow channel of the oxidizing gas flow channel becomes higher than the steam partial pressure of the oxidizing gas flowing in the upstream flow channel adjacent to the downstream flow channel. By this difference between the steam partial pressures, a part of the steam flowing in the downstream flow channel is transported through the gas diffusion layer to the upstream channel adjacent to the downstream channel. As a result, water is transported in an in-plane direction from the downstream channel to the upstream channel.

In this way, in the fuel cell of the present invention, by disposing the upstream flow channel and the downstream flow channel in such a manner that they are adjacent to each other, the difference between the amount of water contained in the reactive gas flowing through the upstream flow channel and the amount of water contained in the reactive gas flowing through the downstream flow channel can be reduced. In this way, it is possible to realize that, excessive humidification of the polymer electrolyte membrane at the portion adjacent to the downstream flow channel is suppressed, and drying of the polymer electrolyte membrane at the portion adjacent to the upstream flow channel is suppressed. Namely, even though the fuel cell of the present invention is operated under non-humidified condition (internal humidifying method), the in-plane water distribution inside of the cell can be made uniform.

Moreover, in the fuel cell of the present invention, the reactive gas flow channel is formed of an S-shaped or spiral pattern, while the upstream flow channel and the downstream flow channel are kept to be adjacent to each other. Therefore, the number of a manifold and accompanied member thereof can be reduced, and the structure of the fuel cell and fuel cell stack can be simplified.

In addition, the length of the gas flow channel can be extended by forming the gas flow channel in an S-shaped or spiral pattern, so that the difference in the steam partial pressures between the upstream flow channel and the downstream flow channel becomes large, whereby water can be transported in the in-plane direction more efficiently as compared with the conventional technologies.

Furthermore, in the fuel cell of the present invention, the wall of the reactive gas flow channel is made to be impermeable to the reaction gas, so that the circulation of the reactive gas between the upstream flow channel and the downstream flow channel can be suppressed. Therefore, the reactive gas can be supplied efficiently to the catalyst layer.

Hereinafter, the exemplary embodiments of the present invention will be explained in detail with reference to the accompanying drawings.

Exemplary Embodiment 1

Figure 4:
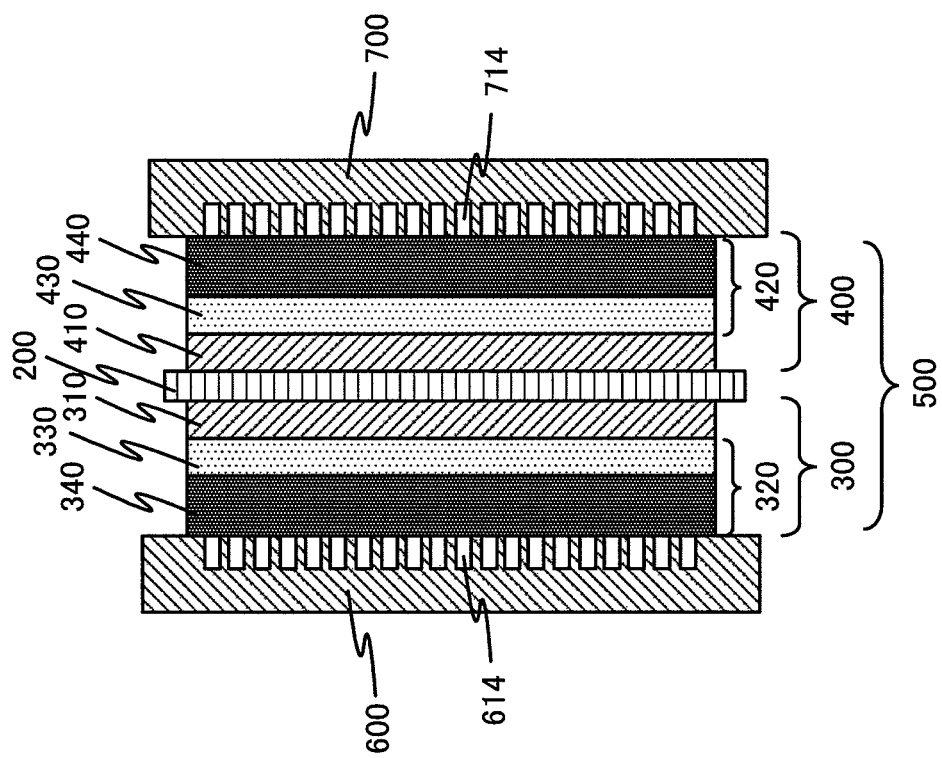
FIG. 4 shows a cross-sectional view of a fuel cell in the exemplary embodiments 1 to 8 of the present invention.

FIG. 4 shows a cross-sectional view of a fuel cell according to the exemplary embodiment 1 of the present invention.

In FIG. 4, the fuel cell has a polymer electrolyte membrane 200, a pair of catalyst electrodes (a fuel electrode 300 and an air electrode 400) sandwiching the polymer electrolyte membrane 200 therebetween, and a pair of separators (a fuel electrode separator 600 and an air electrode separator 700) sandwiching an MEA 500 (an assembly of the polymer electrolyte membrane 200 and the catalyst electrodes 300 and 400). The separators 600 and 700 are made of, for example, carbon. The fuel electrode separator 600 has a fuel gas flow channel 614. The air electrode separator 700 has an oxidizing gas flow channel 714. The fuel electrode 300 is composed of a fuel electrode catalyst layer 310 disposed on the side of the polymer electrolyte membrane, and a fuel electrode gas diffusion layer 320 disposed on the side of the fuel electrode separator. Similarly, the air electrode 400 is composed of an air electrode catalyst layer 410 disposed on the side of the polymer electrolyte membrane, and an air electrode gas diffusion layer 420 disposed on the side of the air electrode separator. Furthermore, the fuel electrode gas diffusion layer 320 is composed of a fuel electrode carbon coat layer 330 disposed on the side of the fuel electrode catalyst layer, and a fuel electrode gas diffusion base material layer 340 disposed on the side of the fuel electrode separator. Similarly, the air electrode gas diffusion layer 420 is composed of an air electrode carbon coat layer 430 disposed on the side of the air electrode catalyst layer, and an air electrode gas diffusion base material layer 440 disposed on the side of the air electrode separator.

The aforementioned membrane and layers may be used as the polymer electrolyte membrane 200, the fuel electrode catalyst layer 310, the fuel electrode carbon coat layer 330, the fuel electrode gas diffusion base material layer 340, the air electrode catalyst layer 410, the air electrode carbon coat layer 430, and the air electrode gas diffusion base material layer 440.

Figure 5:
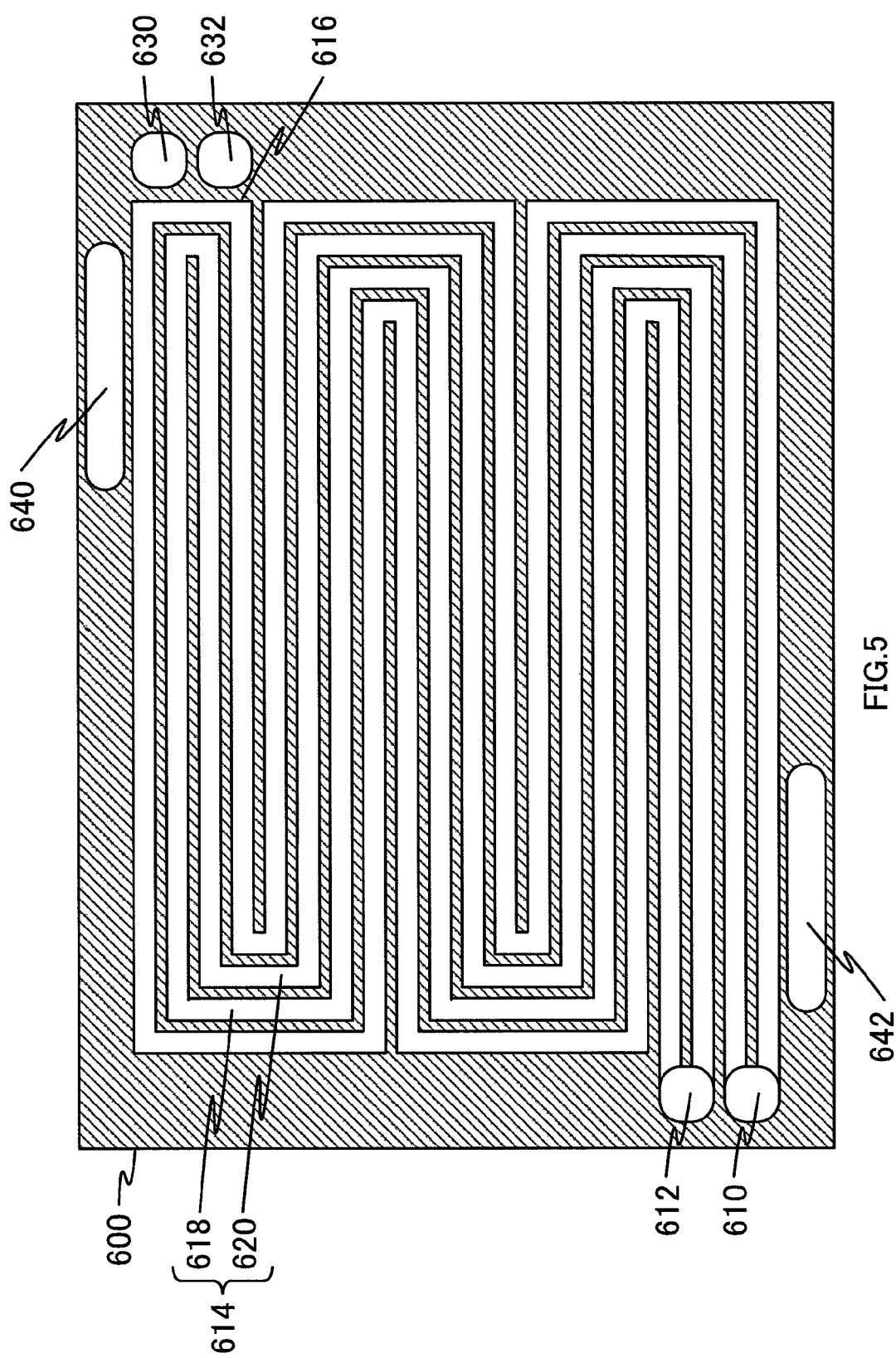
FIG. 5 shows a front view of a fuel electrode separator in the exemplary embodiment 1 of the present invention.

FIG. 5 shows a front view of the face of the fuel electrode separator 600 on side of the fuel electrode that is shown in FIG. 4.

In FIG. 5, the fuel electrode separator 600 has a fuel gas supply manifold 610, a fuel gas exhaust manifold 612, a fuel gas flow channel 614, an oxidizing gas supply manifold 630, an oxidizing gas exhaust manifold 632, a cooling-water supply manifold 640, and a cooling-water exhaust manifold 642. The fuel gas flow channel 614 is composed of a fuel gas forward flow channel 618 that extends from the fuel gas supply manifold 610 to a turn-around portion 616 of forward and return flow channels, and a fuel gas return flow channel 620 that extends from the turn-around portion 616 to the fuel gas exhaust manifold 612.

The fuel gas supply manifold 610 is a hole used to supply a fuel gas to each fuel cell in a fuel cell stack, and supplies the fuel gas to the fuel gas flow channel 614.

The fuel gas exhaust manifold 612 is a hole used to discharge the fuel gas out of each fuel cell of the fuel cell stack, and discharges the fuel gas out of the fuel gas flow channel 614.

The fuel gas flow channel 614 supplies the fuel gas that is fed through the fuel gas supply manifold 610 to the entire face of the fuel electrode 300, and is formed of an S-shaped pattern. The fuel gas forward flow channel 618 and the fuel gas return flow channel 620 are formed in such a manner that they are in opposite directions each other. The wall of the fuel gas flow channel 614 is formed in such a manner that it has no permeability to the fuel gas.

The oxidizing gas supply manifold 630 is a hole used to supply an oxidizing gas to each fuel cell of the fuel cell stack. The oxidizing gas exhaust manifold 632 is a hole used to discharge the oxidizing gas out of each fuel cell of the fuel cell stack.

The cooling-water supply manifold 640 is a hole used to supply cooling-water into the fuel cell stack. The cooling-water exhaust manifold 642 is a hole used to discharge the cooling-water out of the fuel-cell stack. A cooling-water flow channel not shown in FIG. 5 is a flow channel communicating between the cooling-water supply manifold 640 and the cooling-water exhaust manifold 642. For example, the cooling-water flow channel is formed in the fuel electrode separator 600 or in the air electrode separator 700. For example, in a fuel cell stack, the cooling water flow channel may be formed in a face of the fuel electrode separator 600 or the air electrode separator 700, wherein the reactive gas flow channel is not formed on the face, in such a manner that the cooling water flow channel is disposed between the fuel electrode separator 600 and the air electrode separator 700. The cooling water flow channel may be formed in each cell or in every several cells. A structure of the cooling water flow channel is not particularly limited, it may be a structure of plural parallel straight flow channels and may be S-shaped or spiral-shaped.

Figure 6:
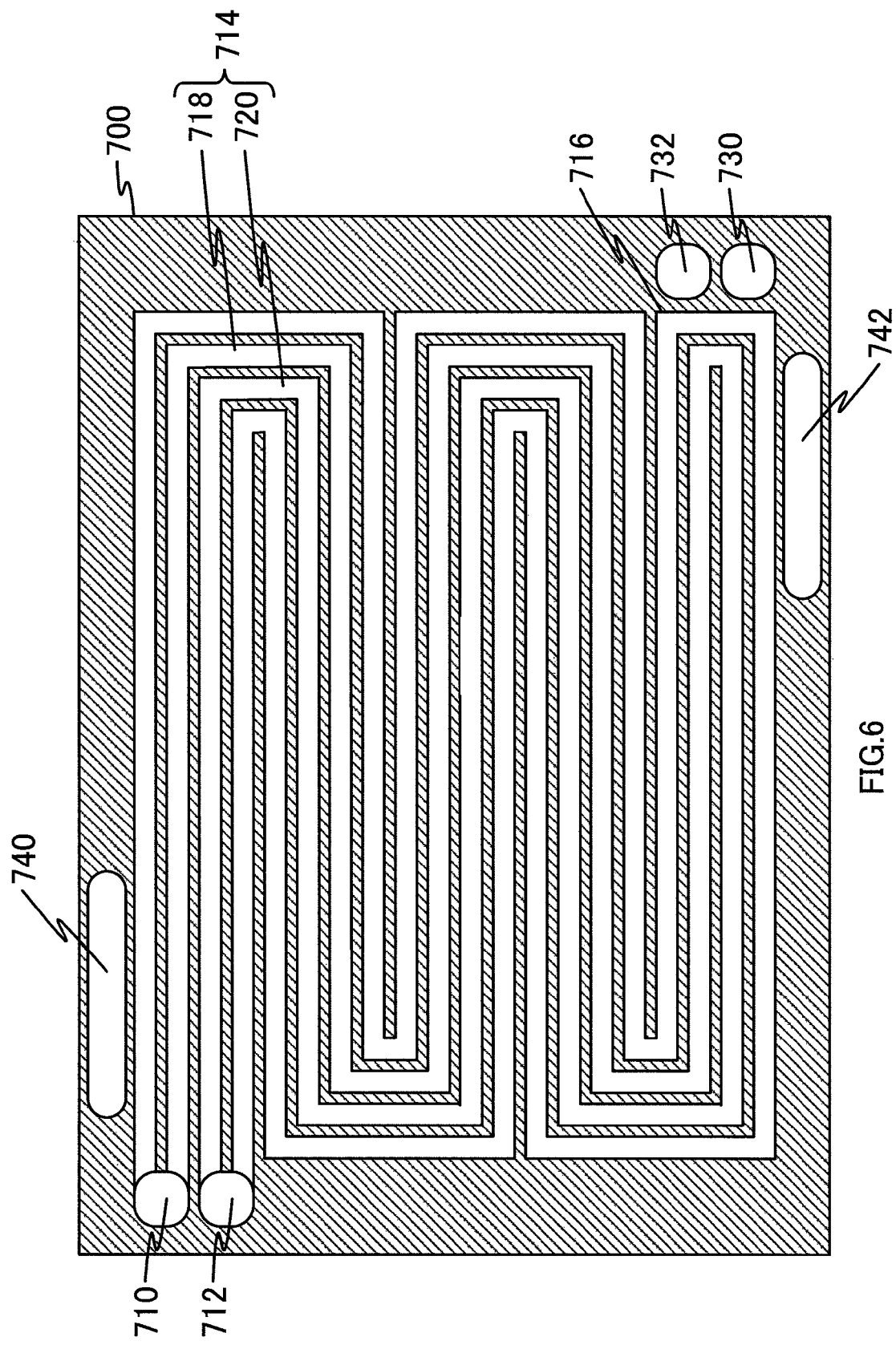
FIG. 6 shows a front view of an air electrode separator in the exemplary embodiment 1 of the present invention.

FIG. 6 shows a front view of the face of the air electrode separator 700 on the side of the air electrode that is shown in FIG. 4.

In FIG. 6, the air electrode separator 700 has an oxidizing gas supply manifold 710, an oxidizing gas exhaust manifold 712, an oxidizing gas flow channel 714, a fuel gas supply manifold 730, a fuel gas exhaust manifold 732, a cooling-water supply manifold 740, and a cooling-water exhaust manifold 742. The oxidizing gas flow channel 714 is composed of an oxidizing gas forward flow channel 718 that extends from the oxidizing gas supply manifold 710 to a turn-around portion 716 of forward and return flow channel and an oxidizing gas return flow channel 720 that extends from the turn-around portion 716 to the oxidizing gas exhaust manifold 712.

The oxidizing gas supply manifold 710 is a hole used to supply an oxidizing gas to each fuel cell of the fuel cell stack, and supplies the oxidizing gas to the oxidizing gas flow channel 714. The oxidizing gas supply manifold 710 communicates with the oxidizing gas supply manifold 630 that is shown in FIG. 5.

The oxidizing gas exhaust manifold 712 is a hole used to discharge the oxidizing gas out of each fuel cell of the fuel cell stack, and discharges the oxidizing gas out of the oxidizing gas flow channel 714. The oxidizing gas exhaust manifold 712 communicates with the oxidizing gas exhaust manifold 632 that is shown in FIG. 5.

The oxidizing gas flow channel 714 supplies the oxidizing gas that is supplied through the oxidizing gas supply manifold 710 to the entire face of the air electrode 400, and is formed of an S-shaped pattern. The oxidizing gas forward flow channel 718 and the oxidizing gas return flow channel 720 are formed in such a manner that they are in opposite directions each other. A wall of the oxidizing gas flow channel 714 is formed in such a manner that it has no permeability to the oxidizing gas. In addition, it is preferable that a width of the oxidizing gas flow channel 714 is 1.1 mm and a depth thereof is 1.1 mm. Furthermore, it is preferable that a spacing between the downstream flow channel (the oxidizing gas flow channel 714 disposed near the oxidizing gas exhaust manifold 712) and the upstream flow channel (the oxidizing gas flow channel 714 disposed near the oxidizing gas supply manifold 710) is from 2.2 mm to 3.3 mm. Namely, the spacing between the upstream flow channel and the downstream flow channel is preferably from 2 to 3 times the width of the oxidizing gas flow channel 714.

The fuel gas supply manifold 730 is a hole used to supply a fuel gas to each fuel cell of the fuel cell stack. The fuel gas supply manifold 730 communicates with the fuel gas supply manifold 610 that is shown in FIG. 5.

The fuel gas exhaust manifold 732 is a hole used to discharge the fuel gas out of each fuel cell of the fuel cell stack. The fuel gas exhaust manifold 732 communicates with the fuel gas exhaust manifold 612 that is shown in FIG. 5.

The cooling-water supply manifold 740 is a hole used to supply cooling-water into the fuel cell stack. The cooling-water supply manifold 740 communicates with the cooling-water supply manifold 640 that is shown in FIG. 5. The cooling-water exhaust manifold 742 is a hole used to discharge the cooling-water out of the fuel cell stack. The cooling-water exhaust manifold 742 communicates with the cooling-water exhaust manifold 642 that is shown in FIG. 5.

For a fuel cell having the above configuration, the mechanism of power generation during operation is explained below.

A fuel gas that is supplied to the fuel gas supply manifolds 610 and 730 of the fuel cell is supplied into the fuel gas flow channel 614 on the fuel electrode separator 600. The fuel gas in the fuel gas flow channel 614 is transported by diffusion to the fuel electrode catalyst layer 310 through the fuel electrode gas diffusion layer 320.

On the other hand, an oxidizing gas that is supplied to the oxidizing gas supply manifolds 630 and 710 of the fuel cell is supplied into the oxidizing gas flow channel 714 on the air electrode separator 700. The oxidizing gas in the oxidizing gas flow channel 714 is transported by diffusion to the air electrode catalyst layer 410 through the air electrode diffusion layer 420.

In the fuel electrode catalyst layer 310, the hydrogen molecule contained in the fuel gas that is transported from the fuel gas flow channel 614 split into a hydrogen ion and an electron. The hydrogen ion is transported by diffusion to the air electrode catalyst layer 410 through the polymer electrolyte membrane 200 in a water-retaining state. On the other hand, the electron is transported to the air electrode catalyst layer 410 through an external circuit that is not shown in FIG. 6.

At the air electrode catalyst layer 410, the hydrogen ion that is transported through the polymer electrolyte membrane 200, the electron that is transported through the external circuit, and oxygen that is transported from the oxidizing gas flow channel 714 react to generate water.

The temperature of the fuel cell becomes high on power generation, so that the water generated is vaporized to form steam. The steam is transported by diffusion to the oxidizing gas flow channel 714 through the air electrode gas diffusion layer 420 and humidifies the oxidizing gas in the oxidizing gas flow channel 714. The oxidizing gas becomes more humidified as it flows through the oxidizing gas flow channel 714. As a result, a partial pressure of the steam in the oxidizing gas that flows through the oxidizing gas return flow channel 720 becomes higher than the partial pressure of the steam in the oxidizing gas that flows through the oxidizing gas forward flow channel 718 that is in the opposite direction of the return flow channel. The resulting difference in the partial pressures of the steam becomes remarkable particularly between the downstream flow channel and the upstream flow channel. By this difference in the partial pressures of the steam, the steam in the oxidizing gas return flow channel 720 is transported in the in-plane direction through the air electrode gas diffusion layer 420 to the oxidizing gas forward flow channel 718 that is in the opposite direction of the return flow channel. As a result, the partial pressure distribution of the steam becomes uniform in, the oxidizing gas flow channel 714.

On the side of the fuel electrode, with the same mechanism as mentioned above, the steam in the fuel gas return flow channel 620 is transported in an in-plane direction to the opposing fuel gas forward flow channel 618 through the fuel electrode gas diffusion layer 320.

As mentioned above, according to the present exemplary embodiment, the forward flow channel and the return flow channel of the reactive gas flow channel are formed in opposite directions each other over the entire flow channel, so that the partial pressure distribution of the steam can be made uniform in the reactive gas flow channel. Therefore, according to the present exemplary embodiment, the entire face of the fuel cell can be used efficiently, so that high power generation performance and stability can be attained.

In addition, by making the wall of the reactive gas flow channel to have no gas permeability to the reactive gas, the circulation of the reactive gas between the downstream flow_channels and upstream flow channel can be prevented. As a result, the reactive gas can be supplied efficiently to the catalyst layer.

Furthermore, according to the present exemplary embodiment, the reactive gas flow channel is formed in an S-shaped pattern, so that the reactive gas can be supplied to the entire face of the fuel cell even though the number of reaction gas flow channels and various kinds of manifolds are small. Therefore, according to the present exemplary embodiment, the high performance and stability of the power generation can be attained without making the structure of the cell and stack complex even when the cell area is made large.

In the present exemplary embodiment, a separator having a reactive gas flow channel with forward flow channel and return flow channels in opposite directions each other in the same plane is applied to both fuel electrode side and air electrode side. However, the separator may be applied only to the air electrode side in which steam is generated.

Furthermore, in the present exemplary embodiment, the number of the gas flow channels communicating between a pair of the manifolds is selected as two, but the number of the gas flow channel may be one or three or more.

Exemplary Embodiment 2

In the exemplary embodiment 2, an example using metal as the material for the separator is described.

A fuel cell of the exemplary embodiment 2 is given by replacing the air electrode separator 700 of the fuel cell of the exemplary embodiment 1 that is shown in FIG. 4 by an air electrode separator 900, and further replacing the fuel electrode separator 600 by a fuel electrode separator 800. Therefore, the duplicate components other than the air electrode separator 900 and the fuel electrode separator 800 are numbered the same and their explanations are omitted.

Figure 7:
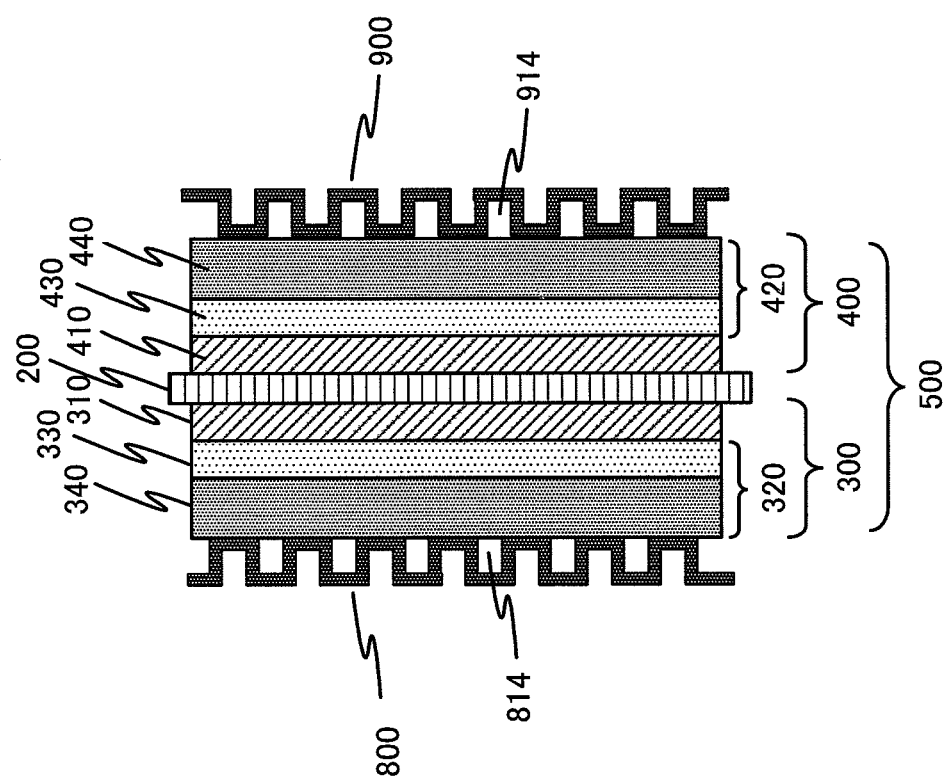
FIG. 7 shows a cross-sectional view of a fuel cell in the exemplary embodiment 2 of the present invention.

FIG. 7 shows a cross-sectional view of a fuel cell according to the exemplary embodiment 2 of the present invention. The same components as the air electrode separator 700 and the fuel electrode separator 600 in the exemplary embodiment 1 are numbered the same and explanations for the duplicate portions are omitted.

In FIG. 7, a metal separator is made of a metal plate. The fuel electrode separator 600 has a fuel gas flow channel 814. The air electrode separator 900 has an oxidizing gas flow channel 914.

The shape of the oxidizing gas flow channel 914 and the fuel gas flow channel 814 may be the same as that of the oxidizing gas flow channel 714. That is, the oxidizing gas flow channel 914 supplies the oxidizing gas that is supplied from the oxidizing gas supply manifold to the entire face of the air electrode 400 and is formed of an S-shaped pattern. The oxidizing gas forward flow channel and the oxidizing gas return flow channel are formed in such a manner that they are in opposite directions each other. The fuel gas flow channel 814 supplies the fuel gas that is supplied from the fuel gas supply manifold to the entire face of the fuel electrode 300 and is formed of an S-shaped pattern. The fuel gas forward flow channel and the fuel gas return flow channel are formed in such a manner that they are in opposite directions each other.

Figure 8:
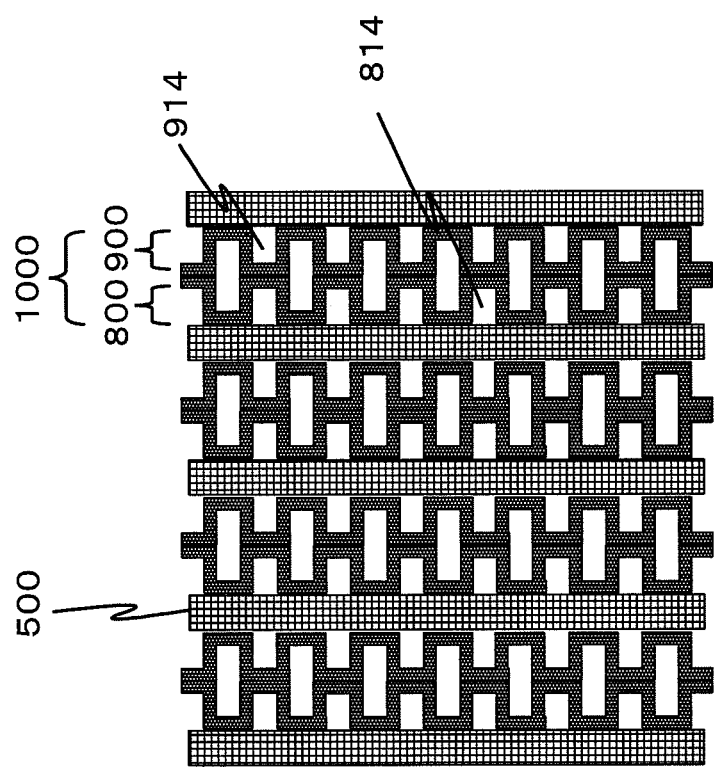
FIG. 8 shows a cross-sectional view of a fuel cell stack in the exemplary embodiment 2 of the present invention.

FIG. 8 shows a cross-sectional view of a fuel cell stack given by stacking the fuel cell shown in FIG. 7.

In FIG. 8, the fuel cell stack is structured by stacking alternately a MEA 500 and a combined metal separator 1000 that is composed of the metal separator 800 and metal separator 900. On the fuel gas diffusion layer side of the combined metal separator 1000 is formed the fuel gas flow channel 814, and on the oxidizing gas diffusion layer side of the combined metal separator 1000 is formed the oxidizing gas flow channel 914. An empty space formed inside of the metal separator 1000 serves as a cooling water flow channel.

When a fuel cell having the foregoing configuration is operated, similarly to the fuel cell of the exemplary embodiment 1, the partial pressure distribution of the steam in the oxidizing gas flow channel becomes uniform.

In addition, by using the metal separator, the circulation of the reactive gas between the upstream flow channel and the downstream flow channel can be prevented more effectively because the metal plate has no permeability to the reactive gas. Consequently, the reactive gas can be supplied efficiently to the air electrode catalyst layer.

Moreover, the metal separator has sufficient mechanical strength even at a thickness of 1 mm or less. As a result, the cell and stack can be reduced in size and weight. Furthermore, the metal separator can be produced easily by press machining and the like, thereby allowing the production cost reduction and mass production of the fuel cell.

Exemplary Embodiment 3

In the exemplary embodiment 1, an example is described where the forward flow channel and the return flow channel of one flow channel are in opposite directions each other. In the exemplary embodiment 3, an example will be described where two different flow channels are in opposite directions each other.

The fuel cell of the exemplary embodiment 3 is given by replacing the air electrode separator 700 of the fuel cell according to the exemplary embodiment 1 that is shown in FIG. 4 by an air electrode separator 702. Therefore, the duplicate components other than the air electrode separator 702 are numbered the same, and their explanations are omitted.

Figure 9:
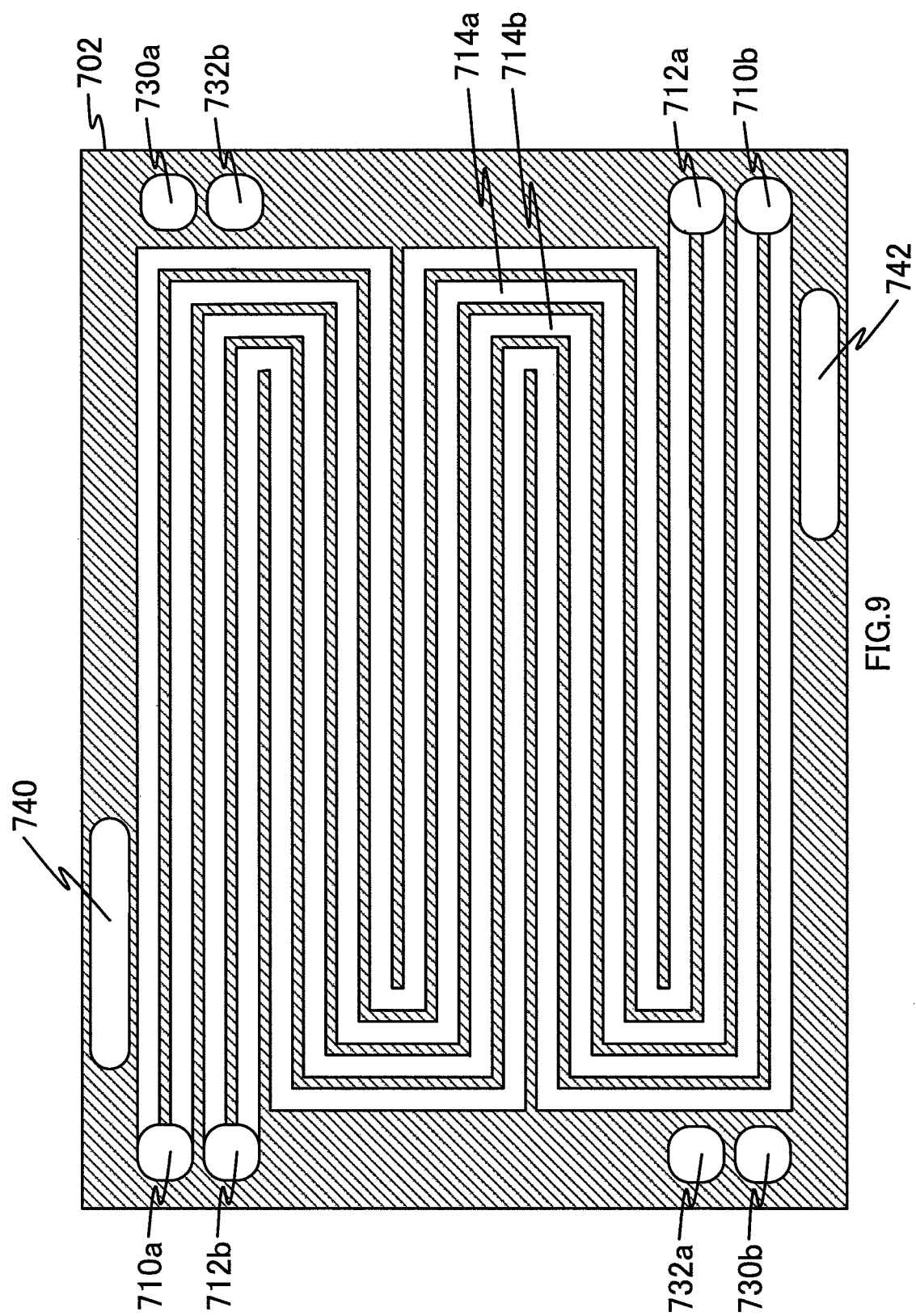
FIG. 9 shows a front view of an air electrode separator in the exemplary embodiment 3 of the present invention.

FIG. 9 shows a front view of the face of an air electrode separator on the air electrode side of a fuel cell according to the exemplary embodiment 3 of the present invention. The same components as the air electrode separator 700 of the exemplary embodiment 1 are numbered the same, and the explanations for the duplicate portions are omitted.

In FIG. 9, the air electrode separator 702 has a first oxidizing gas supply manifold 710a, a second oxidizing gas supply manifold 710b, a first oxidizing gas exhaust manifold 712a, a second oxidizing gas exhaust manifold 712b, a first oxidizing gas flow channel 714a, a second oxidizing gas flow channel 714b, a first fuel gas supply manifold 730a, a second fuel gas supply manifold 730b, a first fuel gas exhaust manifold 732a, a second fuel gas exhaust manifold 732b, a cooling-water supply manifold 740, and a cooling-water exhaust manifold 742.

The first oxidizing gas supply manifold 710a and the second oxidizing gas supply manifold 710b are holes used to supply an oxidizing gas to each fuel cell of a fuel cell stack. The first oxidizing gas supply manifold 710a supplies the oxidizing gas to the first oxidizing gas flow channel 714a. Similarly, the second oxidizing gas supply manifold 710b supplies the oxidizing gas to the second oxidizing gas flow channel 714b.

The first oxidizing gas exhaust manifold 712a and the second oxidizing gas exhaust manifold 712b are holes used to discharge the oxidizing gas out of each fuel cell of the fuel cell stack. The first oxidizing gas exhaust manifold 712a discharges the oxidizing gas out of the first oxidizing gas flow channel 714a. Similarly, the second oxidizing gas exhaust manifold 712b discharges the oxidizing gas out of the second oxidizing gas flow channel 714b.

The first oxidizing gas flow channel 714a and the second oxidizing gas flow channel 714b are used to supply to the face of the air electrode 400 the oxidizing gas that is supplied from the first oxidizing gas supply manifold 710a or the second oxidizing gas supply manifold 710b. The first oxidizing gas flow channel 714a communicates with the first oxidizing gas supply manifold 710a and the first oxidizing gas exhaust manifold 712a. Similarly, the second oxidizing gas flow channel 714b communicates with the second oxidizing gas supply manifold 710b and the second oxidizing gas exhaust manifold 712b. The first oxidizing gas flow channel 714a and the second oxidizing gas flow channel 714b are in opposite directions each other over the entire flow channel and are S-shaped while they are kept to be adjacent to each other. The wall of the oxidizing gas flow channels (714a and 714b) is formed in such a manner that the wall has no permeability to the oxidizing gas. A spacing between the upstream flow channel of the first oxidizing gas flow channel 714a and the downstream flow channel of the second oxidizing gas flow channel 714b, or a spacing between the downstream flow channel of the first oxidizing gas flow channel 714a and the upstream flow channel of the second oxidizing gas flow channel 714b is preferably from 2.2 mm to 3.3 mm.

The first fuel gas supply manifold 730a and the second fuel gas supply manifold 730b are holes that are used to supply a fuel gas to each fuel cell of the fuel cell stack. The first fuel gas exhaust manifold 732a and the second fuel gas supply manifold 732b are holes that are used to discharge the fuel gas out of each cell of the fuel cell stack.

When a fuel cell having the foregoing configuration is operated, similarly to the fuel cell of the exemplary embodiment 1, the partial pressure distribution of the steam in the oxidizing gas flow channels becomes uniform. Namely, the steam in the downstream flow channel of the first oxidizing gas flow channel 714a is transported in an in-plane direction to the upstream flow channel of the opposing second oxidizing gas flow channel 714b. Similarly, the steam in the downstream flow channel of the second oxidizing gas flow channel 714b is transported in an in-plane direction to the upstream flow channel of the opposing first oxidizing gas flow channel 714a.

As mentioned above, according to the present exemplary embodiment, in addition to the effect of the exemplary embodiment 1, the partial pressure distribution of the steam in the oxidizing gas flow channels can be made more uniform because the oxidizing gas flow channels can be formed point-symmetrically. Therefore, the entire face of the fuel cell can be used more efficiently, and still higher performance and stability of the power generation can be attained.

Furthermore, according to the present exemplary embodiment, in addition to the effect of the exemplary embodiment 1, the pressure of a reactive gas in the oxidizing gas supply manifold can be reduced because the length of the oxidizing gas flow channel can be made still shorter. Therefore, the load on a blower that is used to supply the oxidizing gas can be lowered, so that the efficiency of the power generation of an entire power generation system can be still more increased.

Note that, in the present exemplary embodiment, only the flow channel structure on the air electrode side is explained, but the flow channel structure on the fuel electrode side may be the same as the flow channel structure on the air electrode side. In this case, the partial pressure distribution of the steam in-plane direction can be made uniform also on the fuel electrode side.

Exemplary Embodiment 4

In the exemplary embodiments 1 to 3 are described examples where the cross-sectional area of the reactive gas flow channels are the same in the upstream flow channel and downstream flow channel. In the exemplary embodiment 4, an example will be described where the cross-sectional area of the reactive gas flow channel is different between the upstream flow channel and the downstream flow channel.

A fuel cell of the exemplary embodiment 4 is given by replacing the air electrode separator 700 of the fuel cell in the exemplary embodiment 1 shown in FIG. 4 by an air electrode separator 704. The duplicate components other than the air electrode separator 704 are numbered the same, and their explanations are omitted.

Figure 10:
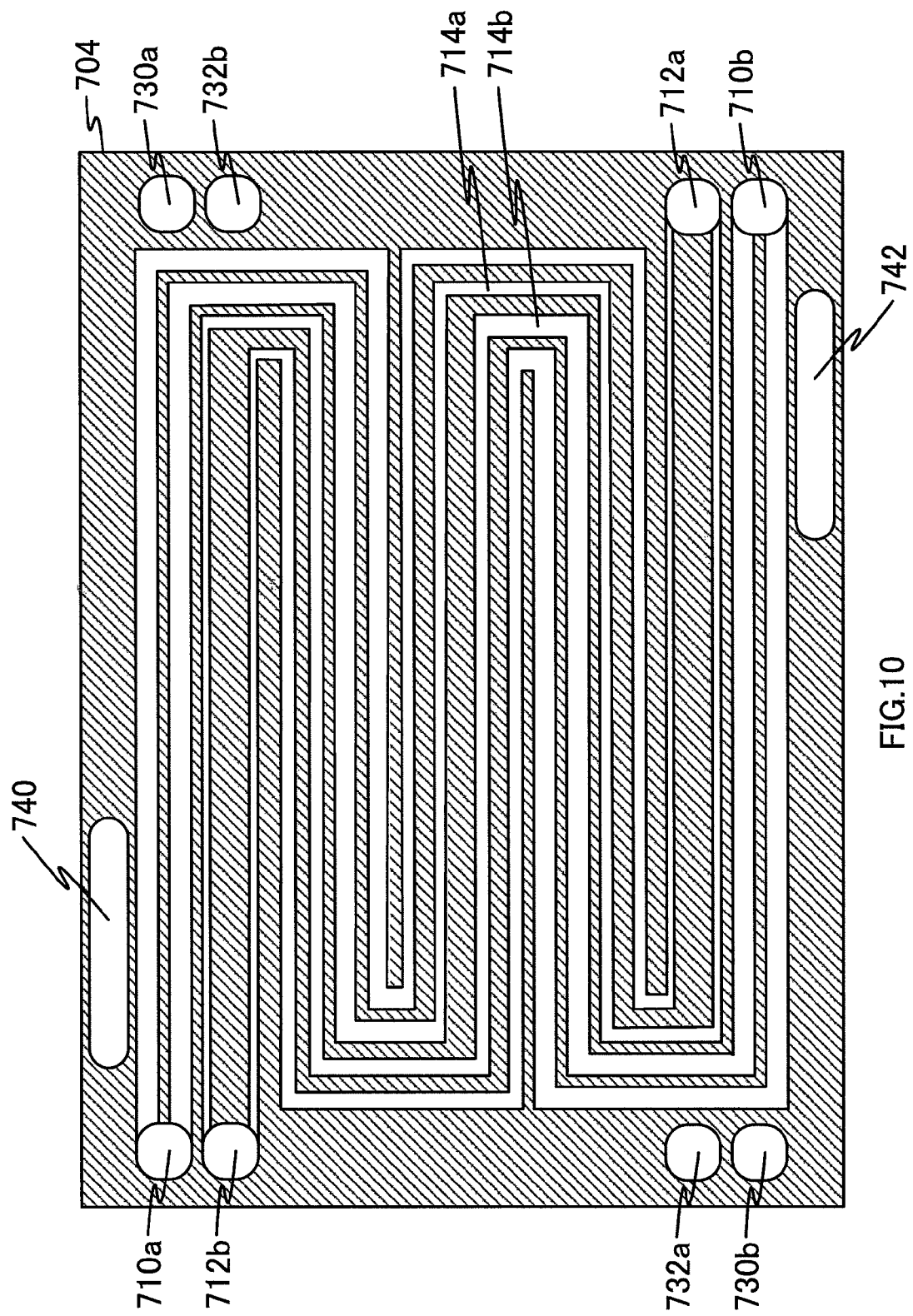
FIG. 10 shows a front view of an air electrode separator in the exemplary embodiment 4 of the present invention.

FIG. 10 shows a front view of the face of an air electrode separator on the air electrode side of a fuel cell according to the exemplary embodiment 4 of the present invention. The same components as the air electrode separator 702 in the exemplary embodiment 3 are numbered the same, and explanations for the duplicate portions are omitted.

In FIG. 10, the air electrode separator 704 has a first oxidizing gas supply manifold 710a, a second oxidizing gas supply manifold 710b, a first oxidizing gas exhaust manifold 712a, a second oxidizing gas exhaust manifold 712b, a first oxidizing gas flow channel 714a, a second oxidizing gas flow channel 714b, a first fuel gas supply manifold 730a, a second fuel gas supply manifold 730b, a first fuel gas exhaust manifold 732a, a second fuel gas exhaust manifold 732b, a cooling-water supply manifold 740, and a cooling-water exhaust manifold 742.

The first oxidizing gas flow channel 714a and the second oxidizing gas flow channel 714b are in opposite directions each other over the entire flow channel similarly to the exemplary embodiment 3, and are S-shaped while they are kept to be adjacent to each other. In addition, the first oxidizing gas flow channel 714a and the second oxidizing gas flow channel 714b are formed in such a manner that a width of the downstream flow channel is narrower than that of the upstream flow channel. The width may be decreased stepwise or gradually from the upstream flow channel to the downstream flow channel. Furthermore, a wall of the oxidizing gas flow channels (714a and 714b) is formed in such a manner that the wall has no permeability to the oxidizing gas.

When a fuel cell having the above mentioned configuration is operated, similarly to the fuel cell of the exemplary embodiment 3, the partial pressure distribution of the steam in the oxidizing gas flow channels 714a and 714b becomes uniform. In addition, the decrease of the oxidizing gas partial pressure caused by consuming the oxidizing gas is suppressed because the cross-sectional area of the downstream flow channel of the oxidizing gas flow channels 714a and 714b is made smaller than that of the upstream flow channel. In this way, the partial pressure distribution of the oxidizing gas in the oxidizing gas flow channels 714a and 714b becomes uniform since the oxidizing gas is not transported in an in-plane direction.

As mentioned above, according to the present exemplary embodiment, in addition to the effect of the exemplary embodiments 1 to 3, the oxidizing gas in the upstream flow channel can be prevented from being transported to the downstream flow channel through the air electrode gas diffusion layer, because the partial pressure of the oxidizing gas in the upstream flow channel of the oxidizing gas flow channel can be made lower than the partial pressure of the oxidizing gas in the downstream flow channel. As a result, a reactive gas can be supplied to the air electrode layer efficiently, so that the efficiency of power generation can be increased.

Note that, in the present exemplary embodiment, the cross-sectional area of the reactive gas flow channel is regulated by changing the width of the reactive gas flow channel, but the cross-sectional area of the gas flow channel may be regulated by changing the depth of the flow channel.

Furthermore, in the present exemplary embodiment, only the flow channel structure on the air electrode side is explained, but the flow channel structure on the fuel electrode side may be the same as the flow channel structure on the air electrode side. In this case, the water distribution and the partial pressure distribution of the fuel gas in an in-plane direction can be made more uniform also on the fuel electrode side.

Exemplary Embodiment 5

In the exemplary embodiments 1 to 4 are described examples where the number of the reactive gas flow channel that communicates with a pair of the manifolds is the same in the upstream flow channel and the downstream flow channel. In the exemplary embodiment 5 an example is described where the number of the reactive gas flow channel that communicates with a pair of the manifolds is different between the upstream flow channel and the downstream flow channel.

A fuel cell of the exemplary embodiment 5 is given by replacing the air electrode separator 700 of the fuel cell in the exemplary embodiment 1 by an air electrode separator 706. The duplicate components other than the air electrode separator 706 are numbered the same, and their explanations are omitted.

Figure 11:
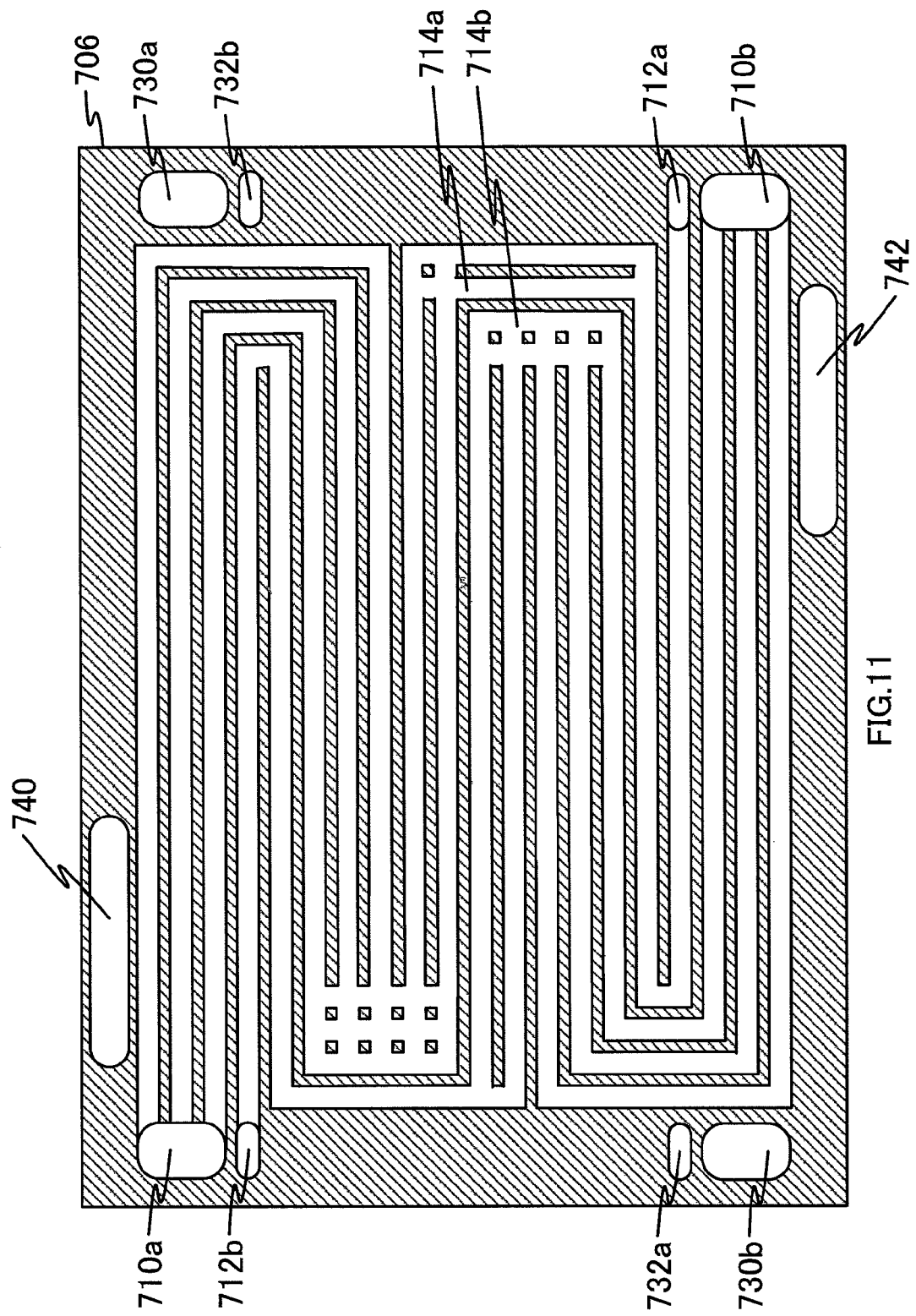
FIG. 11 shows a front view of an air electrode separator in the exemplary embodiment 5 of the present invention.

FIG. 11 shows a front view of the face of an air electrode separator on the air electrode side of a fuel cell according to the exemplary embodiment 5 of the present invention. The same components as the air electrode separator 702 in the exemplary embodiment 3 are numbered the same, and explanations for the duplicate portions are omitted.

In FIG. 11, the air electrode separator 706 has a first oxidizing gas supply manifold 710a, a second oxidizing gas supply manifold 710b, a first oxidizing gas exhaust manifold 712a, a second oxidizing gas exhaust manifold 712b, a first oxidizing gas flow channel 714a, a second oxidizing gas flow channel 714b, a first fuel gas supply manifold 730a, a second fuel gas supply manifold 730b, a first fuel gas exhaust manifold 732a, a second fuel gas exhaust manifold 732b, a cooling-water supply manifold 740, and a cooling-water exhaust manifold 742.

The first oxidizing gas flow channel 714a and the second oxidizing gas flow channel 714b are in opposite directions each other over the entire flow channel similarly to the exemplary embodiment 3, and are S-shaped while they are kept to be adjacent to each other. Furthermore, the first oxidizing gas flow channel 714a and the second oxidizing gas flow channel 714b are formed in such a manner that the number of the downstream flow channels is smaller than that of the upstream flow channel. Furthermore, a wall of the oxidizing gas flow channels (714a and 714b) is formed in such a manner that the wall has no permeability to the oxidizing gas.

When a fuel cell having the foregoing configuration is operated, similarly to the fuel cell of the exemplary embodiment 4, the partial pressure distribution of the steam and oxidizing gas in the oxidizing gas flow channels 714a and 714b becomes uniform. In addition, because the width and depth of the flow channel are constant over the entire flow channel, the contact resistance between the separators and the MEA becomes more uniform over the entire flow channel as compared with the fuel cell of the exemplary embodiment 4.

As mentioned above, according to the present exemplary embodiment, in addition to the effect of the exemplary embodiments 1 to 4, the partial pressure of the oxidizing gas in the upstream flow channel can be made lower than the partial pressure of the oxidizing gas in the downstream flow channel, while the contact between the air electrode separator and the MEA is made uniform. As a result, the variation of a distribution of heat generated by the contact resistance can be suppressed, thereby making more uniform the distribution of the power generation reaction and increasing the efficiency of power generation.

Note that, in the present exemplary embodiment, the number of the oxidizing gas flow channels is decreased at the turn-around portion of the oxidizing gas flow channels, but the number of the oxidizing gas flow channels may be decreased at the straight portion of the oxidizing gas flow channels.

Furthermore, in the present exemplary embodiment, only the flow channel structure on the air electrode side is explained, but the flow channel structure on the fuel electrode side may be the same as the channel structure on the air electrode side. In this case, the water distribution and the partial pressure distribution of the fuel gas in an in-plane direction can be made more uniform also on the fuel electrode side.

Exemplary Embodiment 6

In the exemplary embodiment 6 an example is described where the steam permeability and the reactive gas permeability (hereinafter, called as "steam and the like permeability") of an air electrode gas diffusion base material layer is decreased below the steam and the like permeability of an air electrode carbon coat layer.

A fuel cell of the exemplary embodiment 6 is given by decreasing the steam and the like permeability of the air electrode gas diffusion base material layer 440 below the steam and the like permeability of the air electrode carbon coat layer 430 in the fuel cell of the exemplary embodiment 1 shown in FIG. 4. For the duplicate components other than the air electrode gas diffusion base material layer 440 and the air electrode carbon coat layer 430, their explanations are omitted.

As mentioned above, the air electrode gas diffusion base material layer 440 is formed in such a manner that the steam and the like permeability thereof becomes lower than the stream and the like permeability of the air electrode carbon coat layer 430. In order to attain the foregoing configuration, the steam and the like permeability of the air electrode gas diffusion base material layer 440 may be lowered or the steam and the like permeability of the air electrode carbon coat layer 430 may be increased.

The method of lowering the steam and the like permeability of the air electrode gas diffusion base material layer 440 is not particularly limited, for example, the method may include reducing the diameter of micro-pores formed by carbon fibers; increasing the thickness of the air electrode gas diffusion base material layer 440; applying a water repellant treatment to the air electrode gas diffusion base material layer 440; and the like. On the other hand, the method of increasing the steam and the like permeability of the air electrode carbon coat layer 430 may include decreasing the thickness of the air electrode carbon coat layer 430; applying a hydrophilic treatment to the air electrode carbon coat layer 430; and the like.

When a fuel cell having the foregoing configuration is operated, the steam generated at the air electrode catalyst layer 410 is prevented from being discharged to the oxidizing gas flow channel and is allowed to be transported in an in-plane direction inside of the carbon coat layer.

As mentioned above, according to the present exemplary embodiment, in addition to the effect of the exemplary embodiment 1, an appropriate amount of water can be retained in the catalyst layer and polymer electrolyte membrane, because the water generated in the air electrode catalyst layer is prevented from being vaporized to form steam and discharged to the oxidizing gas flow channel. Furthermore, the steam that stays in the carbon coat layer can be made to be transported easily in an in-plane direction. As a result, the distribution of water inside of the fuel cell can be made more uniform, and the distribution of the power generation reaction is made sore uniform, thereby increasing the efficiency of power generation. The fuel cell according to the present exemplary embodiment can retain an appropriate amount of water uniformly in the catalyst layer and polymer electrolyte membrane even though the fuel cell is operated under a high temperature and non-humidified condition. Therefore, the fuel cell is particularly suitable for high temperature and non-humidified operation.

Note that, in the present exemplary embodiment an example is described where both steam permeability and gas permeability are regulated, but only steam permeability may be regulated.

Furthermore, in the present exemplary embodiment an example is explained where the air electrode side is regulated, but the fuel electrode side may be regulated similarly. In this case, also on the fuel electrode side, an appropriate amount of water can be retained in the catalyst layer and polymer electrolyte membrane, and the water distribution in an in-plane direction can be made more uniform.

Exemplary Embodiment 7

In the exemplary embodiment 6 an example is described where the gas diffusion base material layer is composed of a single layer. In the exemplary embodiment 7 an example will be described where the gas diffusion base material layer is composed of plural layers, and the steam permeability and reactive gas permeability (stream and the like permeability) are lowered in the direction of the outer layer.

Figure 12:
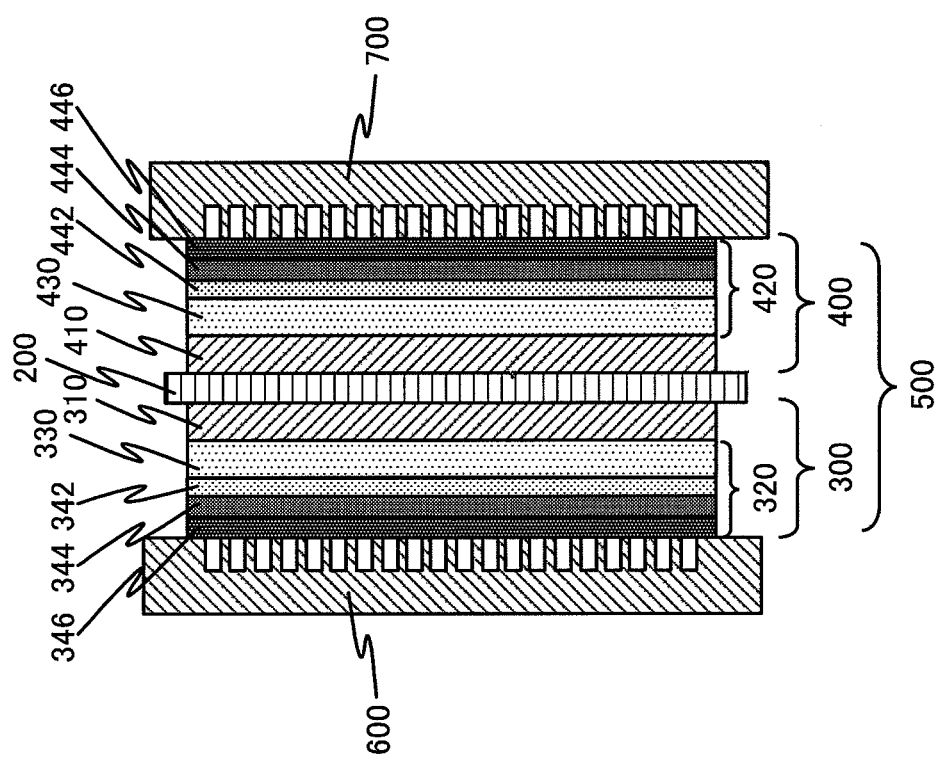
FIG. 12 shows a cross-sectional view of a fuel cell in the exemplary embodiment 7 of the present invention.

FIG. 12 shows a cross-sectional view of a fuel cell according to the exemplary embodiment 7 of the present invention. The same components as that of the fuel cell of the exemplary embodiment 1 are numbered the same, and explanations for the duplicate portions are omitted.

In FIG. 12, the fuel cell has a polymer electrolyte membrane 200, a pair of catalyst electrodes (fuel electrode 300 and air electrode 400), and a pair of separators (fuel electrode separator 600 and air electrode separator 700). The fuel electrode 300 is composed of a fuel electrode catalyst layer 310 disposed on the side of the polymer electrolyte membrane 200 and a fuel electrode gas diffusion layer 320 disposed on the side of the fuel electrode separator 600. Similarly, the air electrode 400 is composed of an air electrode catalyst layer 410 disposed on the side of the polymer electrolyte membrane 200 and an air electrode gas diffusion layer 420 disposed on the side of the air electrode separator 700. Furthermore, the fuel electrode gas diffusion layer 320 is structured by stacking, successively from the side of the fuel electrode catalyst layer 310, a fuel electrode carbon coat layer 330, a first fuel electrode gas diffusion base material layer 342, a second fuel electrode gas diffusion base material layer 344, and a third fuel electrode gas diffusion base material layer 346. Similarly, the air electrode gas diffusion layer 420 is structured by stacking, successively from the air electrode catalyst layer 410, an air electrode carbon coat layer 430, a first air electrode gas diffusion base material layer 442, a second air electrode gas diffusion base material layer 444, and a third air electrode gas diffusion base material layer 446.

The fuel electrode carbon coat layer 330, the first fuel electrode gas diffusion base material layer 342, the second fuel electrode gas diffusion base material layer 344, and the third fuel electrode gas diffusion base material layer 346 composing the fuel electrode gas diffusion layer 320 each have different magnitude of the steam and the like permeability. The fuel electrode carbon coat layer 330 closest to the fuel electrode catalyst layer 310 has a highest value of the steam and the like permeability. Subsequently, the steam and the like permeability decreases in the direction from the electrolyte membrane to the fuel electrode separator 600. That is, the third fuel electrode gas diffusion base material layer 346 closest to the fuel electrode separator 600 has a lowest value of the steam and the like permeability.

Similarly, the air electrode carbon coat layer 430, the first air electrode gas diffusion base material layer 442, the second air electrode gas diffusion base material layer 444, and the third air electrode gas diffusion base material layer 446 composing the air electrode gas diffusion layer 420 each have different magnitude of the steam and the like permeability. The air electrode carbon coat layer 430 closest to the air electrode catalyst layer 410 has a highest value of the steam and the like permeability. Subsequently, the steam and the like permeability decreases in the direction from the electrolyte membrane to the air electrode separator 700. That is, the third air electrode gas diffusion base material layer 446 closest to the air electrode separator 700 has a lowest value of the steam and the like permeability.

When a fuel cell having the foregoing configuration is operated, the steam generated in the air electrode catalyst layer 410 is prevented from being discharged to the reactive gas flow channel and is allowed to be transported in an in-plane direction inside of the carbon coat layer.

As mentioned above, according to the present exemplary embodiment, in addition to the effect of the exemplary embodiment 1, an appropriate amount of water can be retained in the catalyst layer and polymer electrolyte membrane because the water generated at the air electrode catalyst layer is prevented from being vaporized to form steam and being discharged to the oxidizing gas flow channel. Furthermore, the steam that stays inside of the carbon coat layer can be made to be transported easily in an in-plane direction. As a result, the amount of water inside of the fuel cell can be made more uniform, and the distribution of the power generation reaction is made more uniform, thereby increasing the efficiency of power generation. The fuel cell according to the present exemplary embodiment can retain an appropriate amount of water uniformly in the catalyst layer and polymer electrolyte membrane even though the fuel cell is operated under a high temperature and non-humidified condition. The fuel cell is particularly suitable for high temperature and non-humidified operation.

Note that, in the present exemplary embodiment an example is described where both steam permeability and gas permeability are regulated, but only steam permeability may be regulated.

Furthermore, in the present exemplary embodiment a structure is explained where plural gas diffusion base material layers are stacked, but a gradient in the steam permeability and gas permeability may be provided in a single gas diffusion base material layer.

Exemplary Embodiment 8

In the exemplary embodiments 1 to 7 an example is described where the spacing between the forward flow channel and the return flow channel of reactive gas flow channel is constant. In the exemplary embodiment 8 an example is described where the spacing between the forward flow channel and the return flow channel of reactive gas flow channels is changed.

A fuel cell of the exemplary embodiment 8 is given by replacing the air electrode separator 700 of the fuel cell in the exemplary embodiment 1 by an air electrode separator 902. The duplicate components other than the air electrode separator 902 are numbered the same, and their explanations are omitted.

Figure 13:
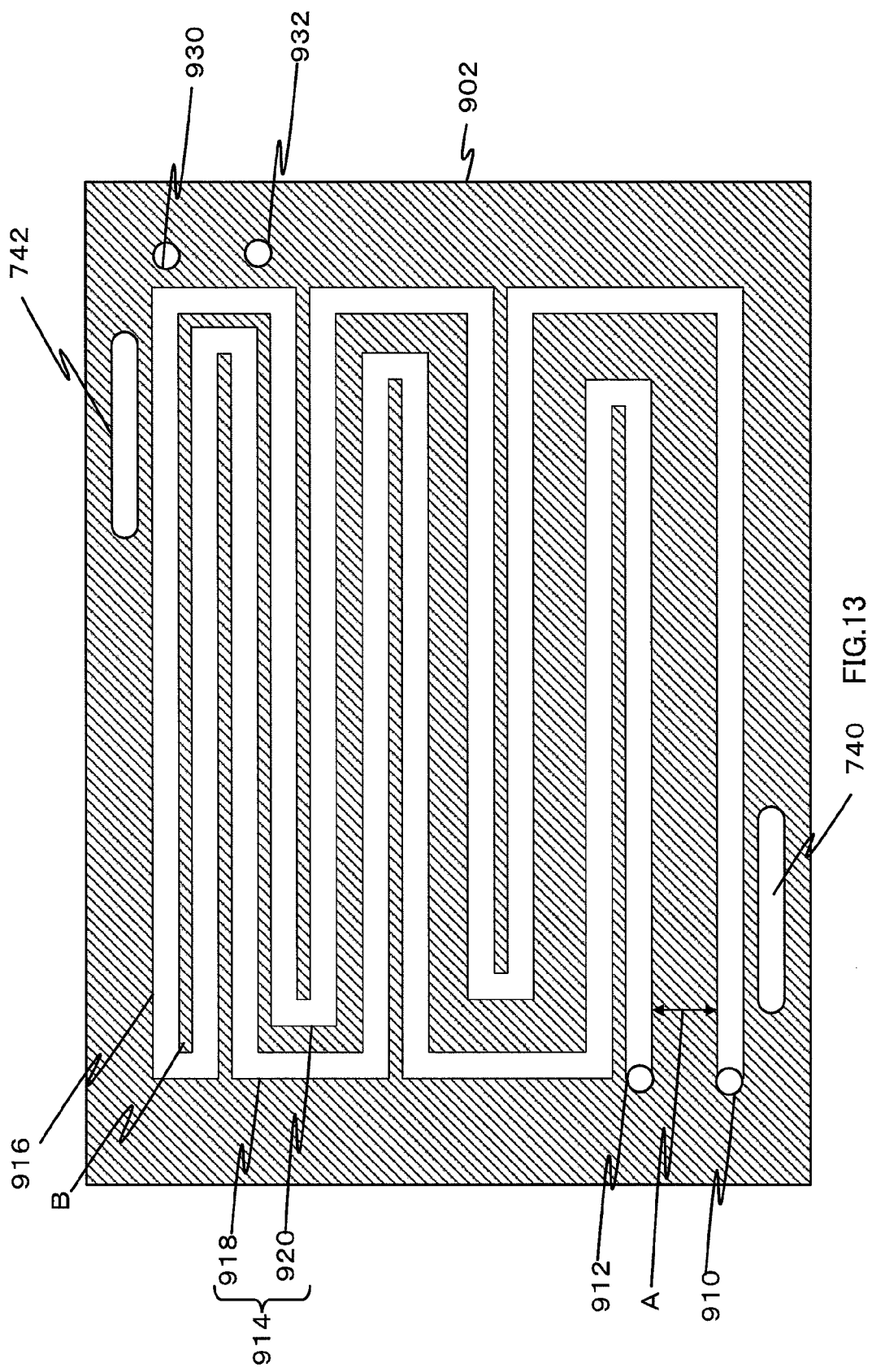
FIG. 13 shows a front view of an air electrode separator in the exemplary embodiment 8 of the present invention.

FIG. 13 is a front view of the face of an air electrode separator on the air electrode side of a fuel cell according to the exemplary embodiment 8 of the present invention. The same components as the air electrode separator 700 in the exemplary embodiment 1 are numbered the same, and explanations for the duplicate portions are omitted.

In FIG. 13, the air electrode separator 902 has an oxidizing gas supply manifold 910, an oxidizing gas exhaust manifold 912, an oxidizing gas flow channel 914, a fuel gas supply manifold 930, a fuel gas exhaust manifold 932, a cooling-water supply manifold 740, and a cooling-water exhaust manifold 742.

The oxidizing gas flow channel 914 supplies to the entire air electrode 400 the oxidizing gas that is supplied from the oxidizing gas supply manifold 910, and is formed of S-shaped pattern. The oxidizing gas forward flow channel 918 and the oxidizing gas return flow channel 920 are formed in such a manner that they are in opposite directions each other. The spacing between the oxidizing gas forward flow channel 918 and the oxidizing gas return flow channel 920 is made large at portion A (in the vicinity of the oxidizing gas supply manifold 910 and the oxidizing gas exhaust manifold 912), and is made small at portion B (in the vicinity of the turn-around portion 916 of the forward and return channel). The spacing may be reduced stepwise or gradually in the direction from the portion A to the portion B. The spacing at the A portion is preferably from 2.2 mm to 3.3 mm. Furthermore, the wall of the oxidizing gas flow channel 914 is formed in such a manner that the wall has no permeability to the oxidizing gas.

When a fuel cell having the foregoing configuration is operated, similarly to the fuel cell of the exemplary embodiment 1, the partial pressure distribution of the steam in the oxidizing gas flow channel 914 becomes uniform. In addition, because the spacing between the upstream flow channel and downstream flow channel is large compared to the spacing between the oxidizing gas forward flow channel 918 and the oxidizing gas return flow channel 920 at the turn-around portion 916 of the forward and return flow channel, the oxidizing gas in the upstream flow channel is prevented from being transported to the downstream flow channel through the air electrode gas diffusion layer.

As mentioned above, according to the present exemplary embodiment, a reactive gas can be supplied efficiently to the air electrode catalyst layer, so that the efficiency of power generation can be still more increased.

Note that, in the present exemplary embodiment, only the flow channel structure on the air electrode side is explained, but the flow channel structure on the fuel electrode side may be designed to be the same as the flow channel structure on the air electrode side. In this case, the partial pressure distribution of the water in an in-plane direction can be made more uniform also on the fuel electrode side.

Hereinafter, exemplary experiments will be explained where the spacing between the upstream flow channel and the downstream flow channel is estimated.

Exemplary Experiment 1

In the present exemplary experiment is explained an experiment using computer simulation in which an optimum spacing between flow channels was estimated.
Program Used A program used in the present exemplary experiment is an electrochemical sub-model of "FLUENT" (Solid Polymer Fuel Cell (PEM) module) available from FLUENT Inc. (refer to "http://www.fluent.co.jp/contents/service/service/service#12.html") The program is designed so as to predict a cell voltage generated when the fuel cell is operated, wherein the fuel cell is characterized by specifying each parameter.
Analysis Conditions Simulation was carried out by specifying each parameter as follows:
Membrane thickness: 30 μm,
Catalyst thickness: 10 μm,
GDL (gas diffusion layer) thickness: 300 μm,
Cathode flow channel depth: 1.1 mm,
Cathode flow channel width: 1.1 mm,
Anode flow channel depth: 1 mm,
Anode flow channel width: 1.1 mm,
Cell temperature: 90° C.,
Anode dew point: 65° C.,
Cathode dew point: 35° C.,
Electrode surface area: 6.1468 $cm^2$,
Percent of hydrogen utilization: 10%,
Percent of oxygen utilization: 50 to 90%,
GDL porosity: 0.75, and
Current density: 0.16/$cm^2$.

Table 1 shows the relation of cell voltage (mV) versus the spacing between flow channels (hereinafter, called as "rib width") and percent of oxygen utilization under the above-mentioned conditions.

TABLE 1

| Rib width | Percent of oxygen utilization (%) | | | | |
|---|---|---|---|---|---|
| (mm) | 50 | 60 | 70 | 80 | 90 |
| 1.1 | 723.1 | 720.5 | 706.7 | 663 | 420.5 |
| 2.2 | 719.9 | 720.7 | 718.4 | 708 | 636.2 |
| 3.3 | 719.6 | 720.8 | 720.1 | 716.6 | 691.5 |
| 4.4 | 719.5 | 720.1 | 719 | 715.2 | 698.4 |

Table 2 shows a relation of the rib width versus the contact resistance and ohmic loss (voltage loss). Table 2 shows that both contact resistance and ohmic loss increase as the rib width increases. The reason is as follows. When the rib width becomes large, the contact area between the separator and GDL increases. When the contact area between the separator and GDL increases while the same magnitude of a fastening force is applied to the cells, a load per unit area lowers. By lowering the load per unit area, the contact resistance is increased exponentially. In this way, when the rib width increases, the contact resistance increases, and the ohmic loss becomes large.

TABLE 2

| | Rib width (mm) | | | | |
|---|---|---|---|---|---|
| | 1.1 | 2.2 | 3.3 | 4.4 | 5.5 |
| Contact resistance (mΩ) | 0.00169 | 0.004917 | 0.00922 | 0.014138 | 0.019977 |
| Ohmic loss (mV) | 0.415615 | 2.418122 | 6.800967 | 13.9042 | 24.55905 |

Table 3 shows the results given by subtracting the ohmic losses of Table 2 from the results of Table 1. The values shown in Table 3 are closer to actual values as compared with the results shown in Table 1, because expected ohmic losses are taken into consideration.

TABLE 3

| Rib width | Percent of oxygen utilization (%) | | | | |
|---|---|---|---|---|---|
| (mm) | 50 | 60 | 70 | 80 | 90 |
| 1.1 | 722.6844 | 720.0844 | 706.2844 | 662.5844 | 420.0844 |
| 2.2 | 717.4819 | 718.2819 | 715.9819 | 705.5819 | 633.7819 |
| 3.3 | 712.799 | 713.999 | 713.299 | 709.799 | 684.699 |
| 4.4 | 705.5958 | 706.1958 | 705.0958 | 701.2958 | 684.4958 |

Figure 14:
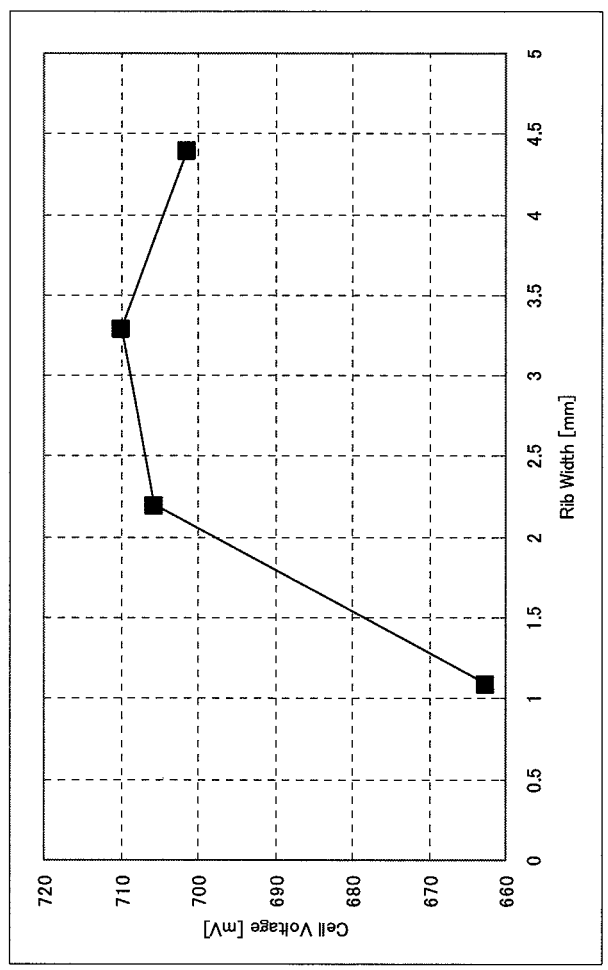
FIG. 14 shows a graph showing the results of the exemplary experiment 1.

FIG. 14 shows a graph showing a relation between the rib width and the cell voltage at 80% of oxygen utilization in Table 3.

In the graph of FIG. 14, the vertical axis is the cell voltage and the abscissa is the rib width. In a rib width region of from 1.1 mm to 3.3 mm, the cell voltage increases as the rib width increases. The cell voltage provides a peak value at a rib width of 3.3 mm. The cell voltage at a rib width of 4.4 mm is small as compared with the cell voltage at rib widths of 3.3 mm and 2.2 mm.

From the results shown above, it has become clear that, under the above analysis conditions, the optimum rib width to keep a high cell voltage is from 2.2 mm to 3.3 mm.

Exemplary Experiment 2

In the present exemplary experiment an experiment is explained where an optimum spacing between flow channels was estimated by using the same program as the exemplary experiment 1. In the present exemplary experiment, unlike the exemplary experiment 1, the GDL thickness parameter was selected as 200 μm. The analysis conditions other than the GDL membrane are the same as the exemplary experiment 1.

Table 4 shows a relation of the cell voltage (mV) versus the rib width and the percent of oxygen utilization under the above-mentioned conditions.

TABLE 4

| Rib width | Percent of oxygen utilization (%) | | | | |
|---|---|---|---|---|---|
| (mm) | 50 | 60 | 70 | 80 | 90 |
| 1.1 | 724.2 | 722.5 | 708.9 | 669.3 | 426 |
| 2.2 | 718.6 | 720.1 | 720 | 716 | 682.1 |
| 3.3 | 718.6 | 719.6 | 719 | 715.9 | 703.5 |
| 4.4 | 717.1 | 716.3 | 713.2 | 705.8 | 681.7 |

Table 5 shows results given by subtracting the ohmic losses shown in Table 2 from the results shown in Table 4. The results shown in Table 5 are closer to actual values as compared with the results shown in Table 4, because expected ohmic losses are taken into consideration.

TABLE 5

| Rib width | Percent of oxygen utilization (%) | | | | |
|---|---|---|---|---|---|
| (mm) | 50 | 60 | 70 | 80 | 90 |
| 1.1 | 723.7844 | 722.0844 | 708.4844 | 668.8844 | 425.5844 |
| 2.2 | 716.1819 | 717.6819 | 717.5819 | 713.5819 | 679.6819 |
| 3.3 | 711.799 | 712.799 | 712.199 | 709.099 | 696.699 |
| 4.4 | 703.1958 | 702.3958 | 699.2958 | 691.8958 | 667.7958 |

Figure 15:
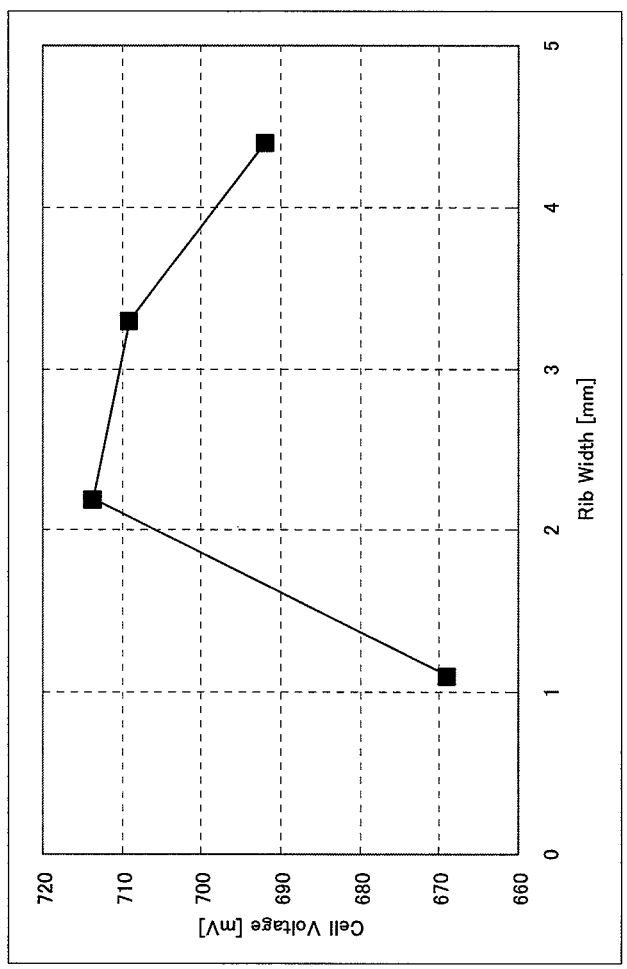
FIG. 15 shows a graph showing the results of the exemplary experiment 2.

FIG. 15 shows a graph showing a relation between the rib width and the cell voltage at 80% of oxygen utilization in Table 5.

In the graph of FIG. 15, the vertical axis is the cell voltage and the abscissa is the rib width. In a rib width region of from 1.1 mm to 2.2 mm, the cell voltage increases as the rib width increases. The cell voltage provides a peak value at a rib width of 2.2 mm. In a rib width region of from 2.2 mm to 4.4 mm, the cell voltage decreases as the rib width increases. The cell voltage at a rib width of 4.4 mm is extremely small as compared with the cell voltage at rib widths of 2.2 mm and 3.3 mm.

From the results mentioned above, it has become clear that, under the above analysis conditions, the optimum rib width to keep a high cell voltage is from 2.2 mm to 3.3 mm.

From the results of the exemplary experiments 1 and 2, it has become clear that at a GDL thickness of from 200 μm to 300 μm, a flow channel width of 1.1 mm, and a flow channel depth of 1.1 mm, a fuel cell can generate electric power at the highest efficiency when the rib width is from 2.2 mm to 3.3 mm, namely, from two to three times the flow channel width.

The present application is based upon and claims a priority from the Japanese Patent Application No. 2006-171995 filed on Jun. 21 in 2006. The entire content of the foregoing Japanese Patent Application is incorporated into the present application.

INDUSTRIAL APPLICABILITY

A fuel cell and fuel cell stack according to the present invention is advantageously used for solid polymer fuel cells and the like that are operated under a high temperature and low humidified condition or a high temperature and non-humidified condition.

The invention claimed is:

1. An internal humidifying fuel cell comprising a polymer electrolyte membrane, a membrane electrode assembly having a pair of catalyst electrodes sandwiching the polymer electrolyte membrane therebetween, and a separator having a gas flow channel for supplying a fuel gas or oxidizing gas to the membrane electrode assembly, wherein
   the gas flow channel is a forward and return channel having an S-shaped or spiral pattern,
   an upstream flow channel of the gas flow channel is adjacent to a downstream flow channel of the gas flow channel, and the gas flowing through the forward flow channel, including the upstream flow channel, is in an opposite direction to the gas flowing through the return flow channel, including the downstream flow channel,
   a wall of the gas flow channel is impermeable to the fuel gas or oxidizing gas, and
   a spacing between the upstream flow channel and the downstream flow channel of the gas flow channel is from 2.2 mm to 3.3 mm and is from 2 to 3 times the width of the gas flow channel.

2. The internal humidifying fuel cell according to claim 1, wherein each of the catalyst electrodes comprises a catalyst layer disposed such that the catalyst layer is in contact with the polymer electrolyte membrane, a carbon coat layer disposed on the outer side of the catalyst layer, and a gas diffusion base material layer disposed on the outer side of the carbon coat layer, and
   the steam permeability of the gas diffusion base material layer is lower than the steam permeability of the carbon coat layer.

3. The internal humidifying fuel cell according to claim 2, wherein the gas diffusion base material layer comprises a plurality of layers each having a different magnitude of steam permeability from each other, and a layer having lower steam permeability is disposed closer to the separator than a layer having higher steam permeability in the gas diffusion base material layer.

4. An internal humidifying fuel cell comprising a polymer electrolyte membrane, a membrane electrode assembly having a pair of catalyst electrodes sandwiching the polymer electrolyte membrane therebetween, and a separator having a plurality of gas flow channels for supplying a fuel gas or oxidizing gas to the membrane electrode assembly, wherein
   the gas flow channel has an S-shaped or spiral pattern,
   an upstream flow channel of a first gas flow channel is adjacent to a downstream flow channel of a second gas flow channel,
   an upstream flow channel of the second gas flow channel is adjacent to a downstream flow channel of the first gas flow channel,
   a wall of the gas flow channel is impermeable to the fuel or oxidizing gas, and
   a spacing between the upstream flow channel of the first gas flow channel and the downstream flow channel of the second gas flow channel or the spacing between the downstream flow channel of the first gas flow channel and the upstream flow channel of the second gas flow channel is from 2.2 mm to 3.3 mm and is from 2 to 3 times the width of the gas flow channel.

5. The internal humidifying fuel cell according to claim 4, wherein each of the catalyst electrodes is composed of a catalyst layer disposed in such a manner that the catalyst layer is in contact with the polymer electrolyte membrane, a carbon coat layer disposed on the outer side of the catalyst layer, and a gas diffusion base material layer disposed on the outer side of the carbon coat layer, and the steam permeability of the gas diffusion base material layer is lower than the steam permeability of the carbon coat layer.

6. An internal humidifying fuel cell comprising a polymer electrolyte membrane, a membrane electrode assembly having a pair of catalyst electrodes sandwiching the polymer electrolyte membrane therebetween, a separator having a gas flow channel for supplying a fuel gas or oxidizing gas to the membrane electrode assembly, a supply manifold through which the fuel gas or oxidizing gas is supplied to the gas flow channel, and an exhaust manifold through which the fuel gas or oxidizing gas is exhausted from the gas flow channel, wherein the gas flow channel is a forward and return channel comprising in an S-shaped or spiral pattern, an upstream flow channel of the gas flow channel is adjacent to a downstream flow channel, of the gas flow channel, and the gas flowing through the forward flow channel, including the upstream flow channel is in an opposite direction to the gas flowing through the return flow channel, including the downstream flow channel, a wall of the gas flow channel is impermeable to the fuel gas or oxidizing gas, and a spacing between the upstream flow channel and the adjacent downstream flow channel running in opposite directions to each other in the gas flow channel is larger than the spacing between the forward flow channel and the return flow channel at a turn-around portion of the gas flow channel, the upstream flow channel is located at in a vicinity of the supply manifold, the downstream flow channel is located at in a vicinity of the exhaust manifold, and the turn-around portion is located in a middle of the gas flow channel; and a spacing between the upstream flow channel and the adjacent downstream flow channel is from 2.2. mm to 3.3 mm and is from 2 to 3 times the width of the gas flow channel.

7. The internal humidifying fuel cell according to claim 6, wherein each of the catalyst electrodes is composed of a catalyst layer disposed in such a manner that the catalyst layer is in contact with the polymer electrolyte membrane, a carbon coat layer disposed on the outer side of the catalyst layer, and a gas diffusion base material layer disposed on the outer side of the carbon coat layer, and the steam permeability of the gas diffusion base material layer is lower than the steam permeability of the carbon coat layer.

* * * * *